(12) United States Patent
Imafuku

(10) Patent No.: US 9,597,899 B2
(45) Date of Patent: Mar. 21, 2017

(54) INFORMATION PROCESSING APPARATUS, PROGRAM, INFORMATION PROCESSING METHOD, PRINTING APPARATUS, AND PRINTING SYSTEM

(71) Applicant: CANON KABUSHIKI KAISHA, Tokyo (JP)

(72) Inventor: Kazuya Imafuku, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/041,004

(22) Filed: Feb. 10, 2016

(65) Prior Publication Data

US 2016/0152049 A1 Jun. 2, 2016

Related U.S. Application Data

(63) Continuation of application No. 14/720,182, filed on May 22, 2015, now Pat. No. 9,278,565.

(30) Foreign Application Priority Data

Jun. 4, 2014 (JP) .................................. 2014-116201

(51) Int. Cl.
*B41J 11/00* (2006.01)
*B41J 13/00* (2006.01)
*B41J 29/38* (2006.01)
*G06F 3/12* (2006.01)

(52) U.S. Cl.
CPC .......... *B41J 11/0095* (2013.01); *B41J 11/008* (2013.01); *B41J 13/0009* (2013.01); *B41J 13/0018* (2013.01); *B41J 13/0027* (2013.01); *B41J 13/0054* (2013.01); *B41J 29/38* (2013.01); *G06F 3/122* (2013.01); *G06F 3/1215* (2013.01); *G06F 3/1244* (2013.01); *G06F 3/1285* (2013.01)

(58) Field of Classification Search
CPC  B41J 13/0009; B41J 13/0054; B41J 13/0027; B41J 11/008
See application file for complete search history.

(56) References Cited

U.S. PATENT DOCUMENTS 6,999,194 B2   2/2006   Kurihara
2005/0088670 A1   4/2005   Folkins

FOREIGN PATENT DOCUMENTS

JP   4478289 A   6/2010

*Primary Examiner* — Julian Huffman
(74) *Attorney, Agent, or Firm* — Fitzpatrick, Cella, Harper & Scinto

(57) ABSTRACT

The present invention provides an information processing apparatus. The apparatus includes a generating unit generating printing data for printing on a printing medium by a printing apparatus, an analyzing unit analyzing a margin amount on a leading edge side of the printing medium based on the printing data, and a transmitting unit transmitting margin information based on an analysis result of the analyzing unit to the printing apparatus prior to transmission of the printing data to the printing apparatus.

20 Claims, 28 Drawing Sheets

FIG. 3
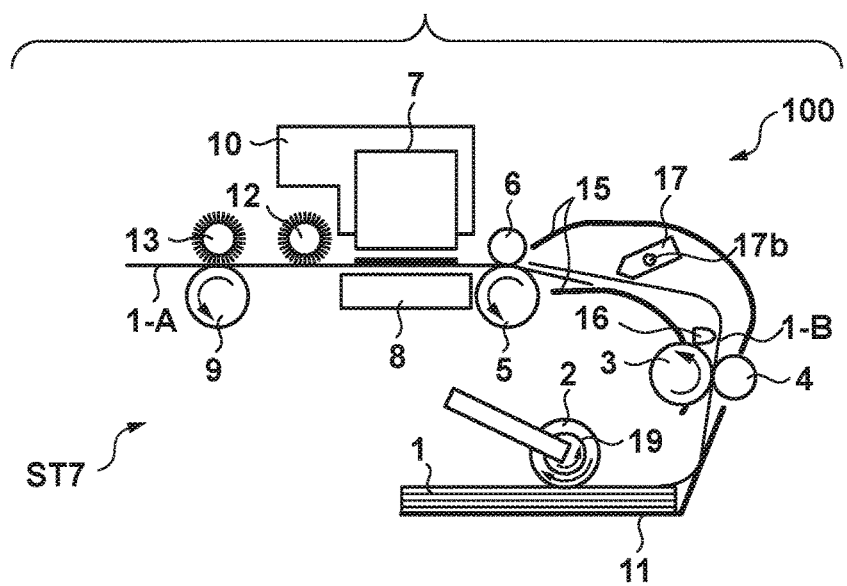
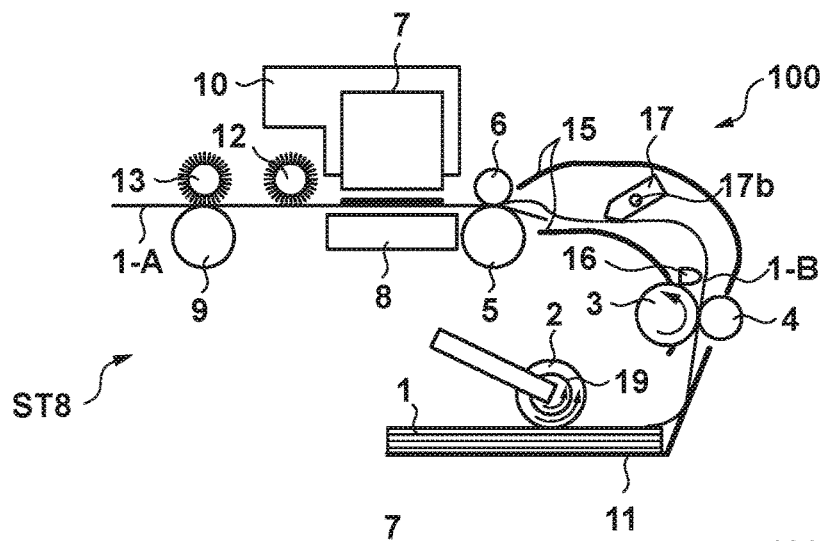
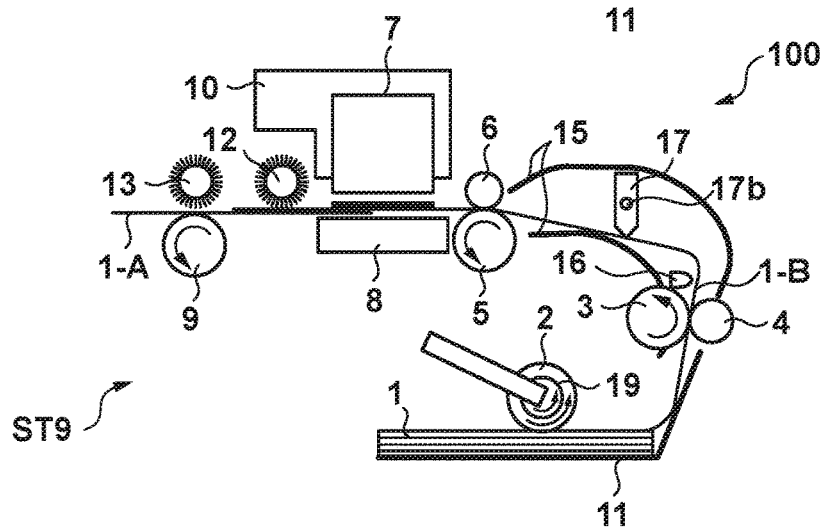

F I G. 5
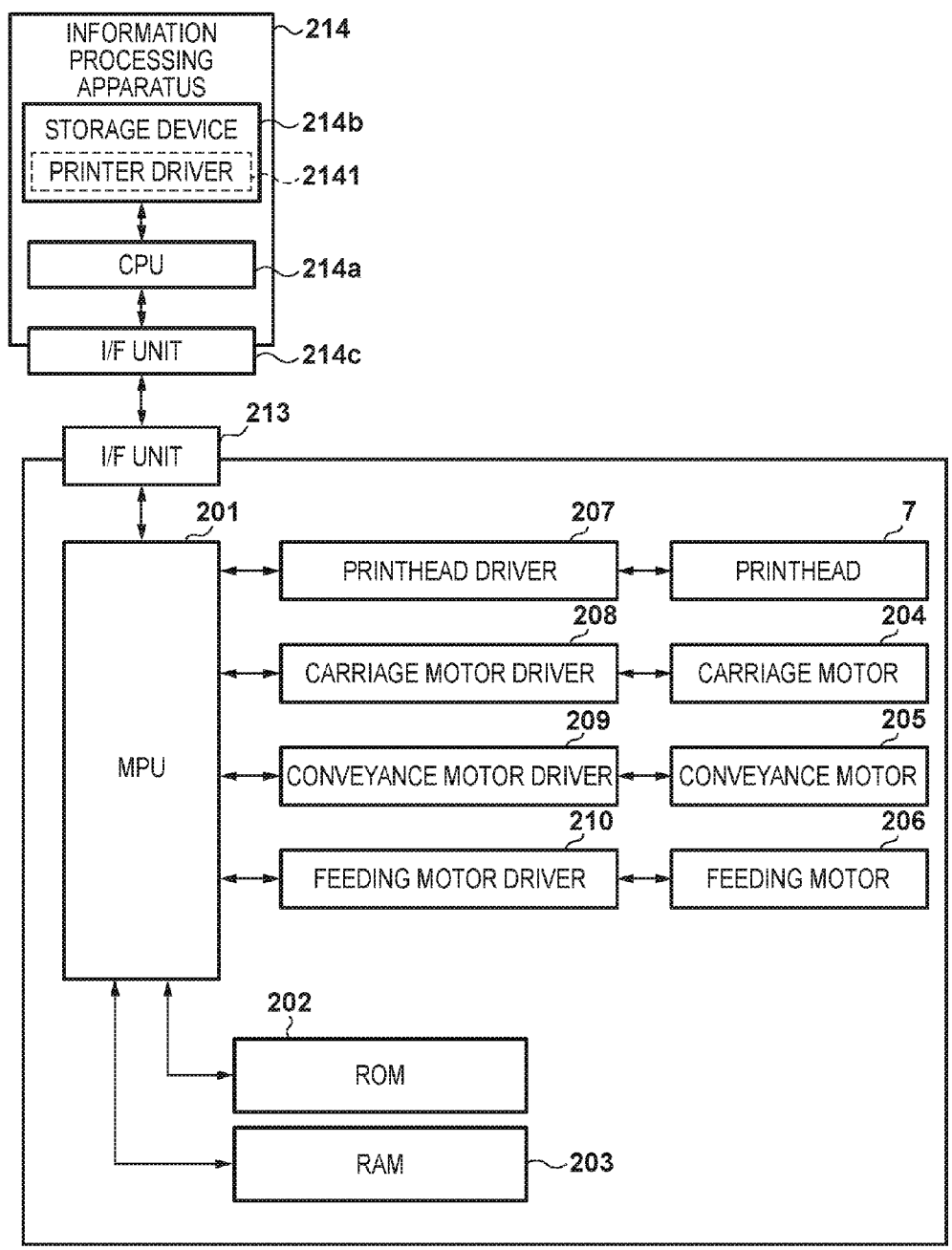

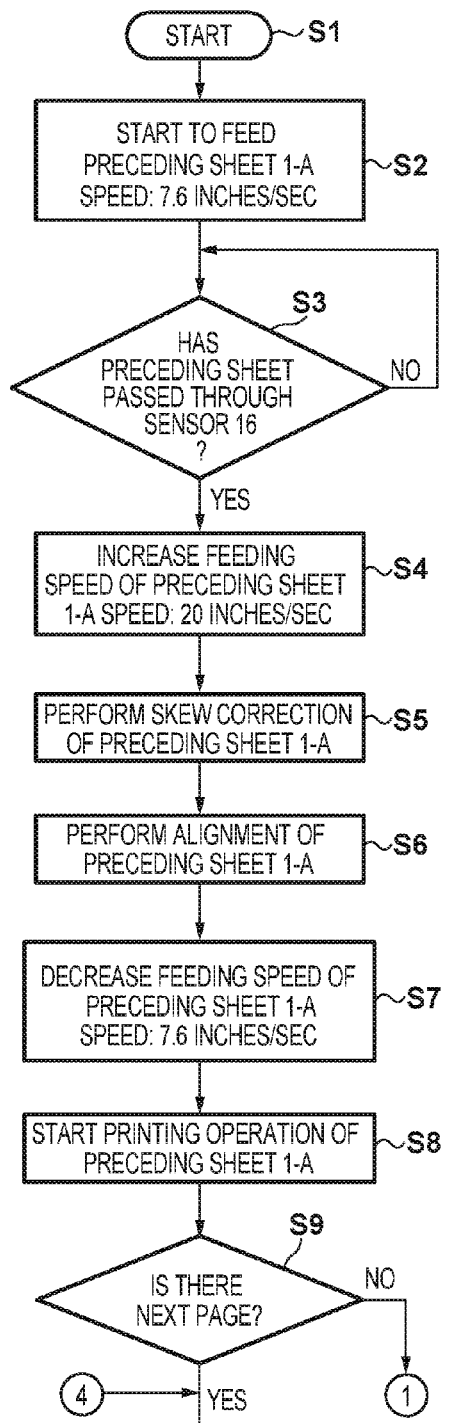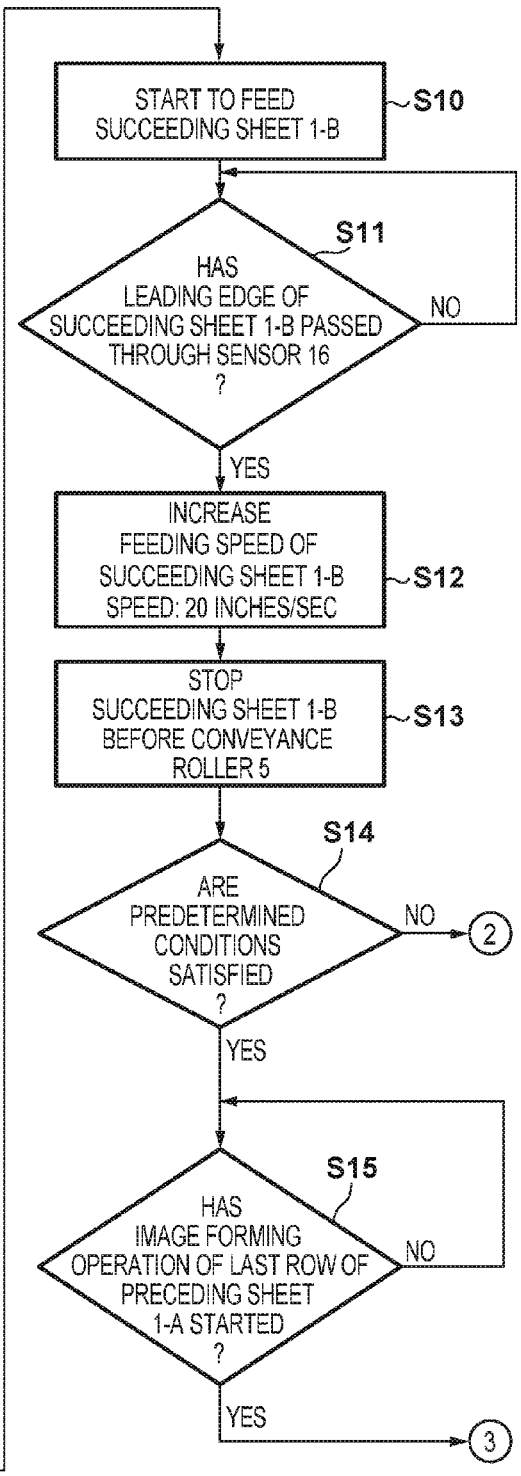
FIG. 6A

FIG. 7
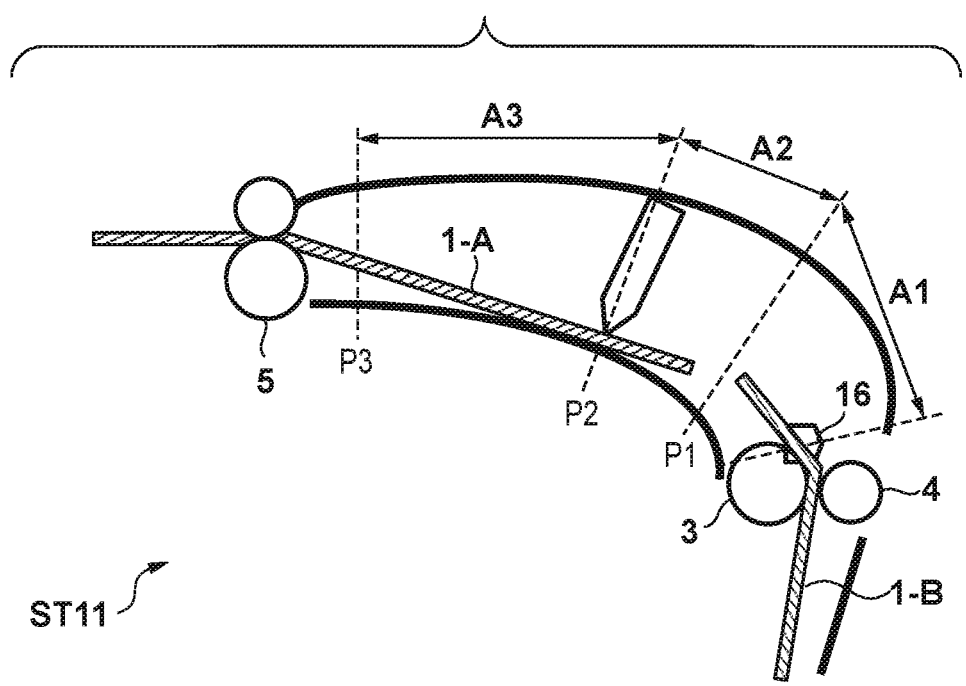
ST11
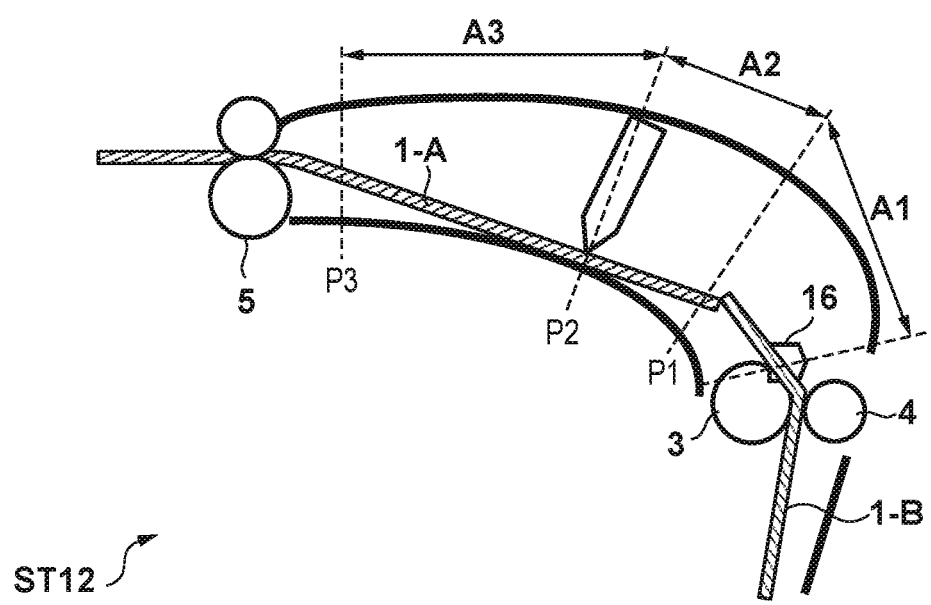
ST12

F I G. 13

| PRINTING SETTINGS | |
|---|---|
| PAPER SIZE | A4 |
| PAPER TYPE | PLAIN PAPER |
| SINGLE-SIDED/DOUBLE-SIDED | SINGLE-SIDED |
| COLOR/MONOCHROME | COLOR |
| PRINTING QUALITY | STANDARD |
| FRAME SETTING | FRAME |

DATA TRANSMISSION SETTING

● TRANSMIT DATA TO PRINTER NOW

○ TRANSMIT DATA AFTER SPOOLING DATA OF ALL PAGES

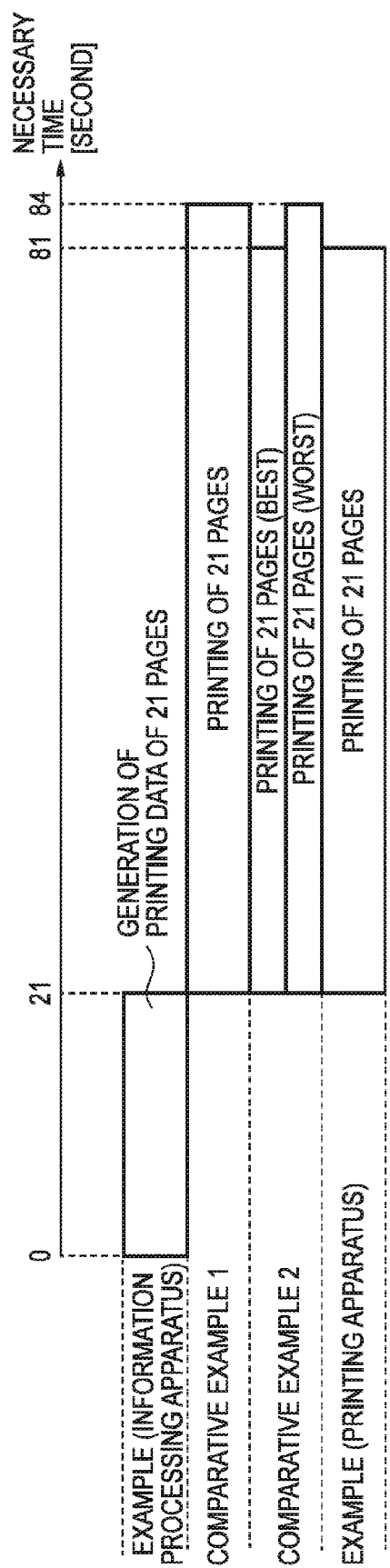

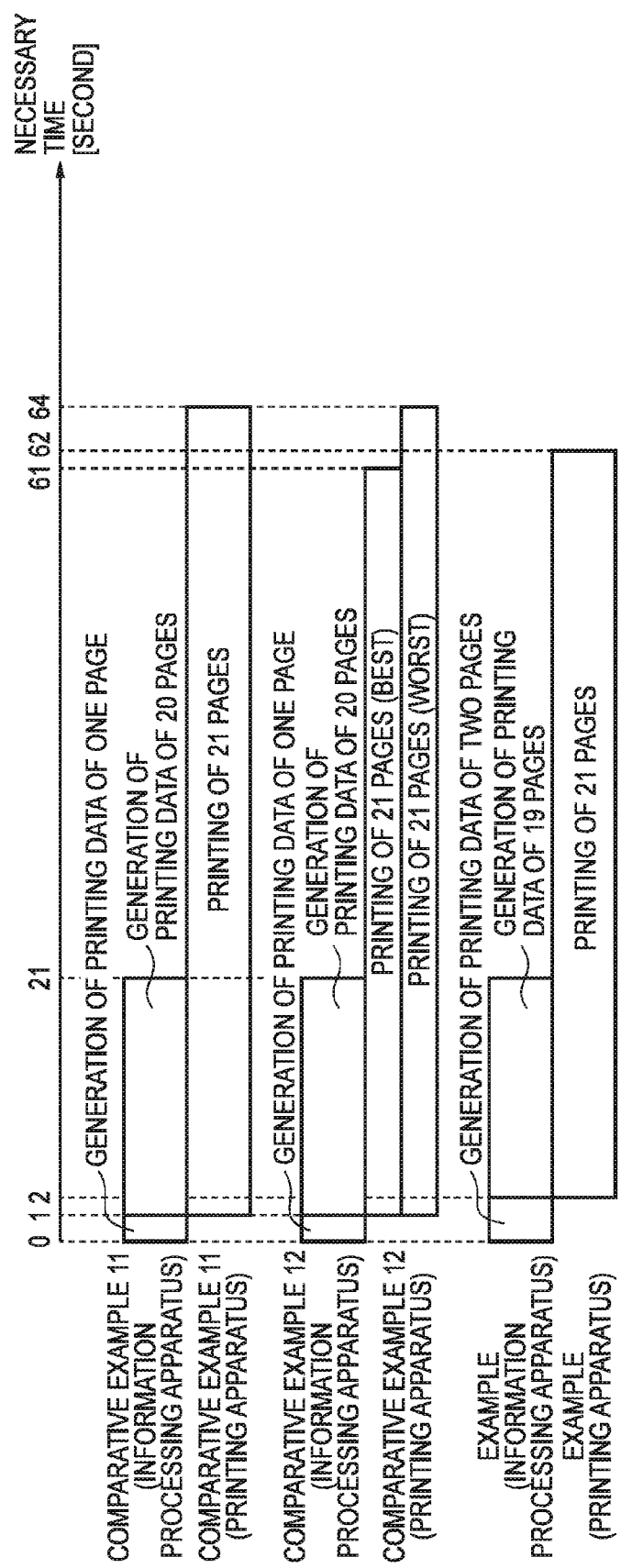

INFORMATION PROCESSING APPARATUS, PROGRAM, INFORMATION PROCESSING METHOD, PRINTING APPARATUS, AND PRINTING SYSTEM

This application is a continuation of U.S. application Ser. No. 14/720,182, filed May 22, 2015 (pending), the contents of which are incorporated herein by reference.

BACKGROUND OF THE INVENTION

Field of the Invention

The present invention relates to a printing apparatus control technique.

Description of the Related Art

As a method of increasing the printing speed of a printing apparatus, successive overlapped conveyance of printing media has been proposed. Successive overlapped conveyance is a method of, when successively printing images on a plurality of printing media, conveying a preceding printing medium and a succeeding printing medium in a state in which the rear edge portion of the preceding printing medium and the leading edge portion of the succeeding printing medium overlap each other (for example, Japanese Patent No. 4478289).

To effectively execute successive overlapped conveyance, the overlap amount between printing media needs to be decided as quickly as possible so as not to stop conveyance of printing media. To decide the overlap amount between printing media, the leading-edge-side margin amount of a succeeding printing medium needs to be specified. When deciding the overlap amount, the printing apparatus needs to refer to printing data of the succeeding printing medium in order to specify the margin amount.

However, a storage device such as a RAM for spooling printing data of a succeeding printing medium is necessary to refer to even this printing data. The storage capacity for spooling printing data of a succeeding printing medium is insufficient in a low-end printing apparatus, and it is sometimes difficult to quickly specify the leading-edge-side margin amount of a succeeding printing medium.

SUMMARY OF THE INVENTION

The present invention provides a technique capable of more quickly specifying the margin amount of a printing medium even in a low-end printing apparatus.

According to an aspect of the present invention, there is provided an information processing apparatus comprising: a generating unit configured to generate printing data for printing on a printing medium by a printing apparatus; an analyzing unit configured to analyze a margin amount on a leading edge side of the printing medium based on the printing data; and a transmitting unit configured to transmit margin information based on an analysis result of the analyzing unit to the printing apparatus prior to transmission of the printing data to the printing apparatus.

Further features of the present invention will become apparent from the following description of exemplary embodiments (with reference to the attached drawings).

BRIEF DESCRIPTION OF THE DRAWINGS

FIG. 3 is a view for explaining the operation of the printing apparatus shown in FIG. 1;

FIG. 5 is a block diagram showing an example of the arrangement of a printing system according to the embodiment of the present invention;

FIGS. 6A and 6B are flowcharts illustrating an example of processing executed by the control unit of the printing apparatus shown in FIG. 1;

FIG. 7 is a view for explaining an operation of making a succeeding sheet overlap a preceding sheet;

FIG. 13 is a view showing an example of a printing setting selection screen;

FIGS. 21A and 21B are views for explaining a difference in printing speed between an example and comparative examples.

DESCRIPTION OF THE EMBODIMENTS

First Embodiment

Figure 1:
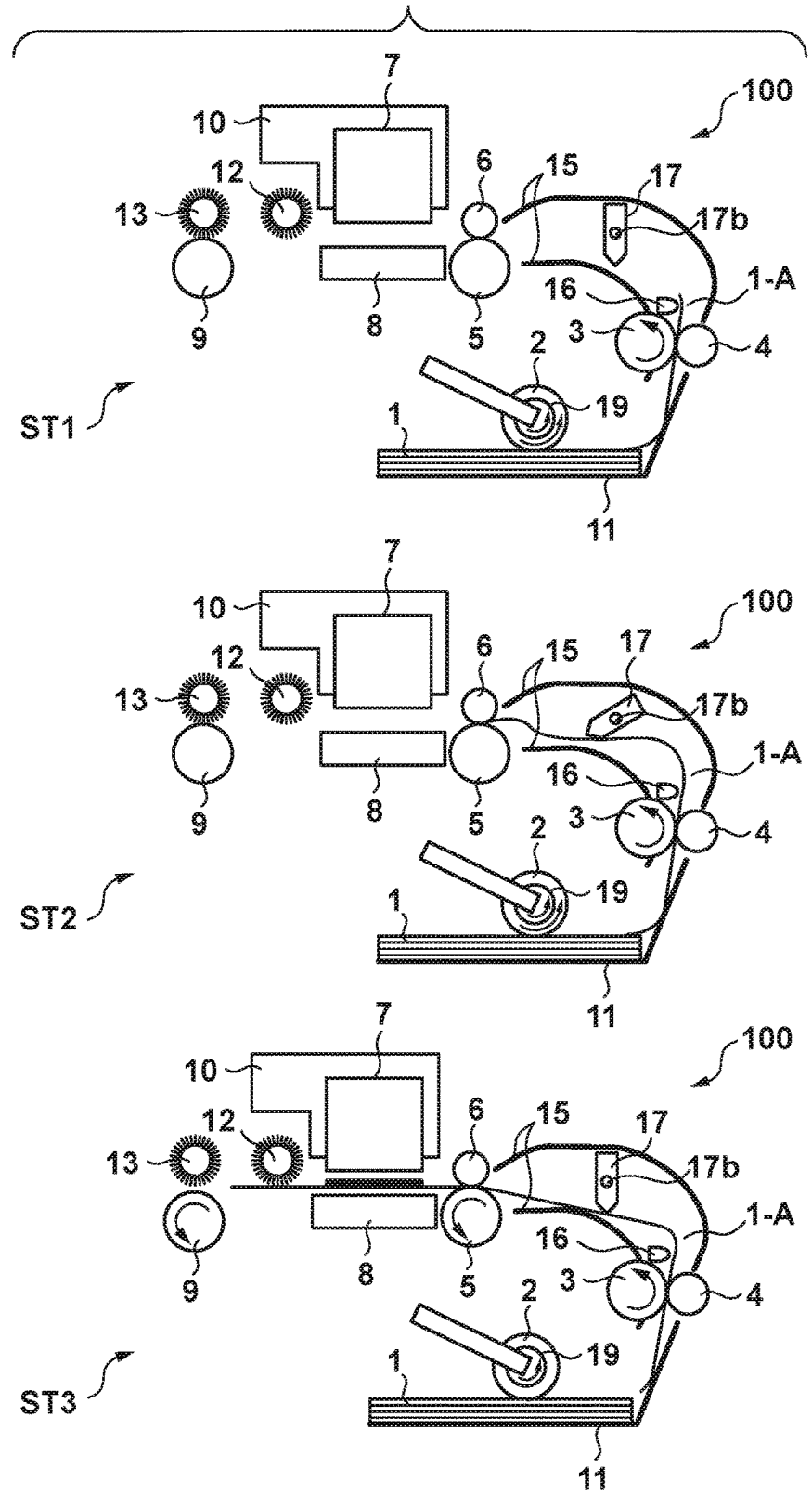
FIG. 1 is a view for explaining the operation of a printing apparatus according to an embodiment of the present invention.
Figure 2:
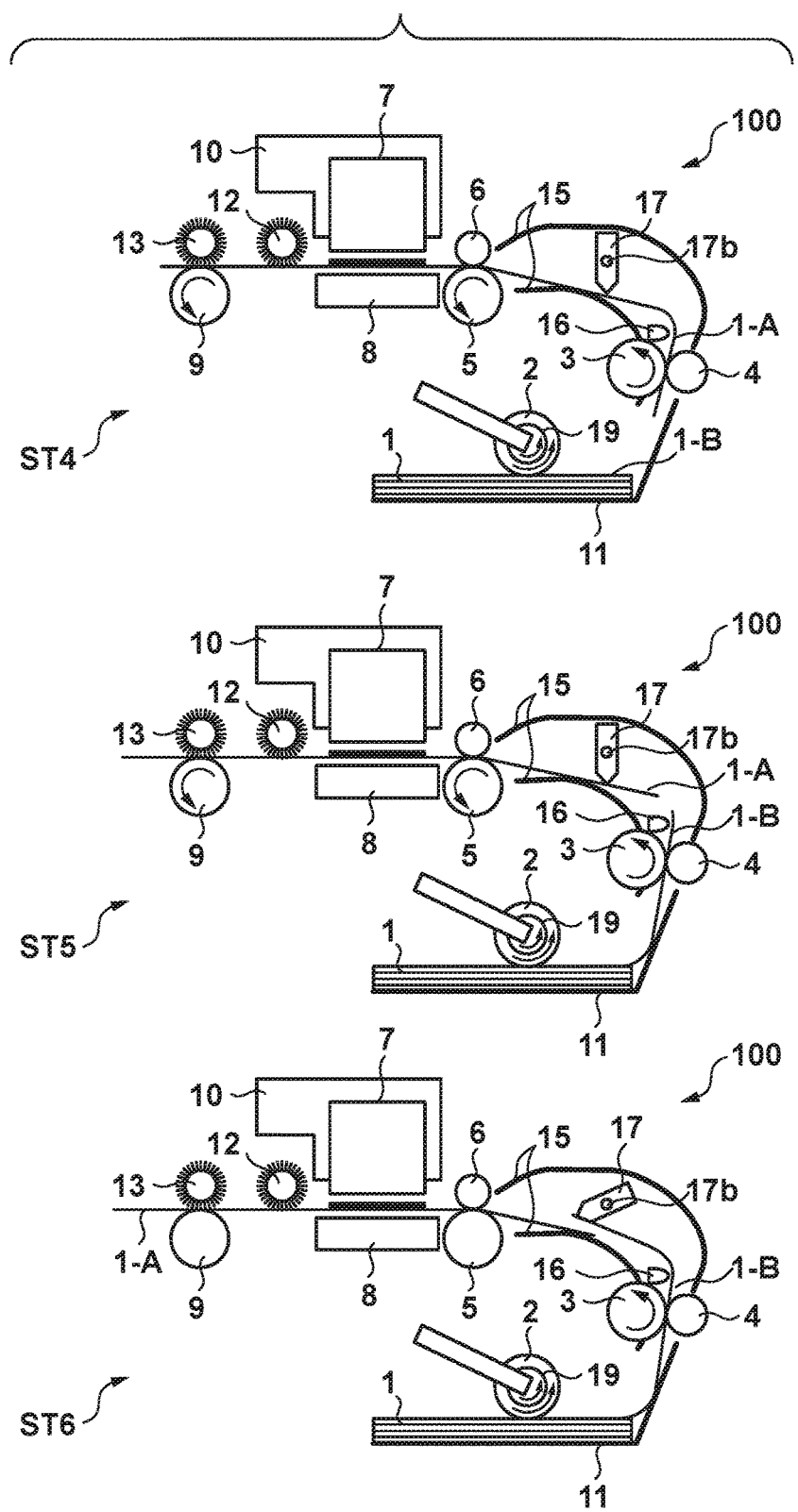
FIG. 2 is a view for explaining the operation of the printing apparatus shown in FIG. 1.

FIGS. 1 to 3 are views for explaining the operation of a printing apparatus 100 according to the embodiment of the present invention, especially, a successive overlapped conveyance operation. FIGS. 1 to 3 schematically show the sectional structure of the printing apparatus 100. In this embodiment, a case in which the present invention is applied to a serial type inkjet printing apparatus will be described. However, the present invention is also applicable to printing apparatuses of other forms.

Note that the term "printing" not only includes the formation of significant information such as characters and graphics, but also broadly includes the formation of images, figures, patterns, and the like on a printing medium, or the processing of the medium, regardless of whether they are significant or insignificant and whether they are so visualized as to be visually perceivable by humans. Also, sheet-like paper is assumed as a "printing medium" in this embodiment, but cloth, plastic film, and the like may be used as printing media. A sheet-like printing medium will be referred to as a printing sheet hereinafter.

Prior to a description of the operation of the printing apparatus 100, the arrangement of the printing apparatus 100 will be described with reference to a state ST1 of FIG. 1. The printing apparatus 100 includes a feeding tray 11 (a stacking unit) on which a plurality of printing sheets 1 can be stacked, a printing unit for printing on the printing sheet 1, and a conveyance apparatus capable of conveying the printing sheet 1 on the feeding tray 11.

The printing unit includes a printhead 7 and a carriage 10. The printhead 7 prints on the printing sheet 1. In this embodiment, the printhead 7 is an inkjet printhead which prints on the printing sheet 1 by discharging ink. A platen 8 which supports the reverse surface of the printing sheet 1 is arranged at a position facing the printhead 7. The carriage 10 incorporates the printhead 7 and moves in a direction intersecting a conveyance direction.

The conveyance apparatus is broadly divided into a feeding mechanism, conveying mechanism, and a discharging mechanism. The feeding mechanism feeds the printing sheet 1, and the conveying mechanism conveys the fed printing sheet 1 to the discharging mechanism. The discharging mechanism conveys the printing sheet 1 outside the printing apparatus 100. Conveyance of the printing sheet 1 being printed is mainly performed by the conveying mechanism. In this way, the printing sheet 1 is sequentially conveyed by the feeding mechanism, conveying mechanism, and discharging mechanism. The feeding mechanism side will be referred to as the upstream side of the conveyance direction and the discharging mechanism side will be referred to as the downstream side of the conveyance direction.

The feeding mechanism includes a pickup roller 2, a feeding roller 3, and a feeding driven roller 4. The pickup roller 2 abuts against the top printing sheet 1 stacked on the feeding tray 11 to pick it up. The feeding roller 3 feeds the printing sheet 1 picked up by the pickup roller 2 toward the downstream side of the conveyance direction. The feeding driven roller 4 is biased and pressed against the feeding roller 3 by an elastic member (for example, a spring) (not shown) to nip the printing sheet 1 with the feeding roller 3, thereby feeding the printing sheet 1.

Figure 4A:
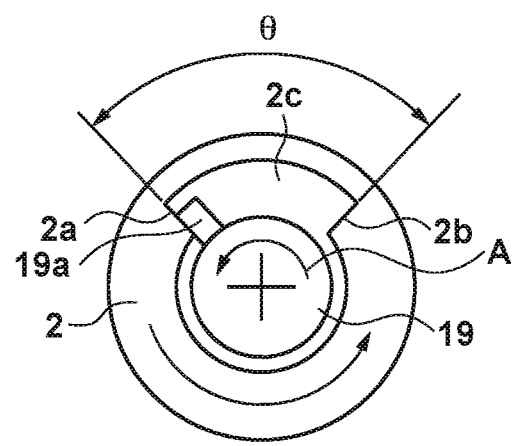
FIGS. 4A and 4B are views for explaining a pickup roller.
Figure 4B:
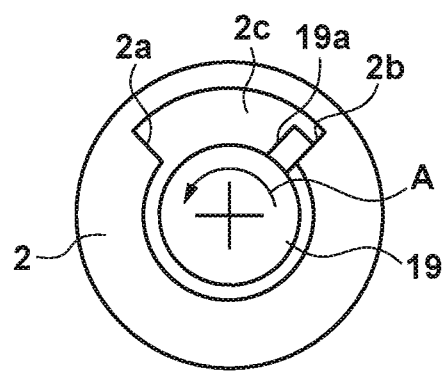

FIGS. 4A and 4B are views for explaining the arrangement of the pickup roller 2. A driving shaft 19 is provided in the pickup roller 2. The driving shaft 19 transmits the driving force of a feeding motor (to be described later) to the pickup roller 2. When picking up the printing sheet 1, the driving shaft 19 and the pickup roller 2 rotate in a direction indicated by an arrow A in FIGS. 4A and 4B. A projection 19a is formed in the driving shaft 19. A concave portion 2c in which the projection 19a fits is formed in the pickup roller 2.

As shown in FIG. 4A, when the projection 19a abuts against a first surface 2a of the concave portion 2c of the pickup roller 2, driving of the driving shaft 19 is transmitted to the pickup roller 2. In this case, when the driving shaft 19 is driven, the pickup roller 2 is also rotated. On the other hand, as shown in FIG. 4B, when the projection 19a abuts against a second surface 2b of the concave portion 2c of the pickup roller 2, driving of the driving shaft 19 is not transmitted to the pickup roller 2. In this case, even if the driving shaft 19 is driven, the pickup roller 2 is not rotated. Also, when the projection 19a is formed between the first surface 2a and the second surface 2b without abutting against the first surface 2a or the second surface 2b, even if the driving shaft 19 is driven, the pickup roller 2 is not rotated. Although a description will be provided later, when successively feeding the plurality of printing sheets 1 by this mechanism, it is possible to ensure a given gap between the printing sheets 1.

Referring back to FIG. 1, the conveying mechanism includes a conveyance roller 5 and a pinch roller 6. The conveyance roller 5 conveys the printing sheet 1 fed by the feeding roller 3 and the feeding driven roller 4 to a position facing the printhead 7. The pinch roller 6 is biased and pressed against the conveyance roller 5 by an elastic member (for example, a spring) (not shown) to nip and convey the printing sheet 1 with the conveyance roller 5. At the time of printing, for example, an image is printed on the printing sheet 1 by alternately repeating, for example, conveyance of the printing sheet 1 by a predetermined amount by the conveyance roller 5 and the pinch roller 6, movement of the carriage 10, and discharge of ink from the printhead 7.

A conveyance guide 15 for guiding conveyance of the printing sheet 1 is provided in a conveyance section between a nip portion (to be referred to as a feeding nip portion hereinafter) formed by the feeding roller 3 and feeding driven roller 4 and a nip portion (to be referred to as a conveyance nip portion hereinafter) formed by the conveyance roller 5 and pinch roller 6.

The discharging mechanism includes a discharge roller 9 and spurs 12 and 13. The discharge roller 9 discharges the printing sheet 1 printed by the printhead 7 to the outside of the apparatus. The spurs 12 and 13 rotate while they are in contact with the printing surface of the printing sheet 1 printed by the printhead 7. The spur 13 on the downstream side is biased and pressed against the discharge roller 9 by an elastic member (for example, a spring) (not shown). No discharge roller 9 is arranged at a position facing the spur 12 on the upstream side. The spur 12 is used to prevent the floating of the printing sheet 1, and is also referred to as a pressing spur.

The printing apparatus 100 includes a sheet detection sensor 16. The sheet detection sensor 16 detects the leading edge and rear edge of the printing sheet 1, and is, for example, an optical sensor. The sheet detection sensor 16 is provided downstream of the feeding roller 3 in the conveyance direction. A sheet pressing lever 17 makes the leading edge of the succeeding printing sheet 1 (to be referred to as the succeeding printing medium or succeeding sheet hereinafter) overlap the rear edge of the preceding printing sheet 1 (to be referred to as the preceding printing medium or the preceding sheet hereinafter) by pressing the rear edge. Note that the leading edge and rear edge of the printing sheet 1 indicate the edge on the downstream side and the edge on the upstream side of the conveyance direction, respectively. The sheet pressing lever 17 is biased by an elastic member (for example, a spring) (not shown) around a rotating shaft 17b in a counterclockwise direction in FIG. 1.

An example of the arrangement of a printing system including the control unit of the printing apparatus 100 and an information processing apparatus 214 capable of transmitting printing data to the printing apparatus 100 will be described with reference to FIG. 5.

The printing apparatus 100 includes an MPU 201. The MPU 201 can control the operation of each component of the printing apparatus 100, and performs data processing and the like. As will be described later, the MPU 201 can control conveyance of the printing sheets 1 so that the rear edge of the preceding sheet and the leading edge of the succeeding sheet overlap each other. A ROM 202 stores data and programs to be executed by the MPU 201. A RAM 203 temporarily stores processing data to be executed by the MPU 201 and printing data received from the information processing apparatus 214. Note that other storage devices can be used instead of the ROM 202 and RAM 203.

A printhead driver 207 drives the printhead 7. A carriage motor driver 208 drives a carriage motor 204 as the driving source of a driving mechanism for moving the carriage 10. A conveyance motor 205 serves as the driving source of the driving mechanism of the conveyance roller 5 and discharge roller 9. A conveyance motor driver 209 drives the conveyance motor 205.

A feeding motor 206 serves as the driving source of the driving mechanism of the pickup roller 2 and feeding roller 3. A feeding motor driver 210 drives the feeding motor 206.

The MPU 201 controls the printing operation (discharge of ink and movement of the printhead 7) of the printhead 7 via the printhead driver 207 and carriage motor driver 208. The MPU 201 also controls conveyance of the printing sheets 1 via the conveyance motor driver 209 and feeding motor driver 210.

The information processing apparatus 214 is, for example, a personal computer or portable terminal (for example, a smartphone or tablet terminal), and functions as the host computer of the printing apparatus 100. The information processing apparatus 214 includes a CPU 214a, a storage device 214b, and an I/F unit (interface unit) 214c. The CPU 214a executes a program stored in the storage device 214b. The storage device 214b is a RAM, a ROM, a hard disk, or the like, and stores a program to be executed by the CPU 214a and various data. The storage device 214b stores a printer driver 2141 for controlling the printing apparatus 100. By executing the printer driver 2141, the information processing apparatus 214 can generate printing data. Also, the information processing apparatus 214 can analyze the generated printing data. In addition, the information processing apparatus 214 can determine various conditions. The information processing apparatus 214 and printing apparatus 100 can transmit and receive data via the I/F unit 214c and an I/F unit 213.

<Example of Successive Overlapped Conveyance>

A successive overlapped conveyance operation will be described in time series with reference to FIGS. 1 to 3. When the information processing apparatus 214 transmits printing data via the I/F unit 213, the printing data is processed by the MPU 201, and then loaded into the RAM 203. The MPU 201 starts a printing operation based on the loaded data.

A description will be provided with reference to the state ST1 of FIG. 1. First, the feeding motor driver 210 drives the feeding motor 206. This rotates the pickup roller 2. At this stage, the feeding motor 206 is driven to rotate at a relatively low speed. In this example, the pickup roller 2 is exemplarily rotated at 7.6 inches/sec.

When the pickup roller 2 rotates, the top printing sheet (a preceding sheet 1-A) stacked on the feeding tray 11 is picked up. The preceding sheet 1-A picked up by the pickup roller 2 is conveyed by the feeding roller 3 rotating in the same direction as that of the pickup roller 2. The feeding motor 206 also drives the feeding roller 3. This embodiment will be described by using an arrangement including the pickup roller 2 and the feeding roller 3. However, an arrangement including only a feeding roller for feeding the printing sheet stacked on the stacking unit may be adopted.

When the sheet detection sensor 16 provided on the downstream side of the feeding roller 3 detects the leading edge of the preceding sheet 1-A, the feeding motor 206 is driven to rotate at a relatively high speed. In this example, the pickup roller 2 and feeding roller 3 exemplarily rotate at 20 inches/sec.

A description will be provided with reference to a state ST2 of FIG. 1. When the feeding roller 3 is continuously rotated, the leading edge of the preceding sheet 1-A rotates the sheet pressing lever 17 about the rotating shaft 17b in the clockwise direction against the biasing force of the spring. When the feeding roller 3 is further continuously rotated, the leading edge of the preceding sheet 1-A abuts against the conveyance nip portion formed by the conveyance roller 5 and pinch roller 6. At this time, the conveyance roller 5 stops. By rotating the feeding roller 3 by a predetermined amount even after the leading edge of the preceding sheet 1-A abuts against the conveyance nip portion, alignment of the preceding sheet 1-A is performed to correct the skew while the leading edge of the preceding sheet 1-A abuts against the conveyance nip portion. The skew correction operation will also be referred to as a registration adjustment operation.

A description will be provided with reference to a state ST3 of FIG. 1. Upon the end of the skew correction operation of the preceding sheet 1-A, the conveyance motor 205 is driven to start rotation of the conveyance roller 5. The conveyance roller 5 conveys the sheet at, for example, 15 inches/sec. After the preceding sheet 1-A is aligned at the position facing the printhead 7, a printing operation is performed by discharging ink from the printhead 7 based on the printing data.

Note that the alignment operation is performed by making the leading edge of the printing sheet abut against the conveyance nip portion to temporarily position the printing sheet at the position of the conveyance roller 5, and controlling the rotation amount of the conveyance roller 5 with reference to the position of the conveyance roller 5.

The printing apparatus 100 of this embodiment is a serial type printing apparatus in which the carriage 10 mounts the printhead 7. The printing operation of the printing sheet 1 is performed by repeating a conveyance operation and an image forming operation. The conveyance operation is an operation of intermittently conveying the printing sheet by a predetermined amount using the conveyance roller 5. The image forming operation is an operation of discharging ink from the printhead 7 while moving the carriage 10 incorporating the printhead 7 when the conveyance roller 5 stops.

When alignment of the preceding sheet 1-A is performed, the feeding motor 206 is switched to low-speed driving again. That is, the pickup roller 2 and feeding roller 3 rotate at 7.6 inches/sec. While the conveyance roller 5 intermittently conveys the printing sheet 1 by the predetermined amount, the feeding motor 206 also intermittently drives the feeding roller 3. That is, while the conveyance roller 5 rotates, the feeding roller 3 also rotates. While the conveyance roller 5 stops, the feeding roller 3 also stops. The rotation speed of the feeding roller 3 is lower than that of the conveyance roller 5. Consequently, the printing sheet 1 is stretched between the conveyance roller 5 and the feeding roller 3. The feeding roller 3 is rotated together with the printing sheet 1 conveyed by the conveyance roller 5.

When the feeding motor 206 is intermittently driven, the driving shaft 19 also rotates. As described above, however, the rotation speed of the pickup roller 2 is lower than that of the conveyance roller 5. Consequently, the pickup roller 2 is rotated together with the printing sheet 1 conveyed by the conveyance roller 5. The pickup roller 2 thus rotates ahead of the driving shaft 19. More specifically, the projection 19*a* of the driving shaft 19 is spaced apart from the first surface 2*a* and abuts against the second surface 2*b*. Therefore, the second printing sheet (a succeeding sheet 1-B) is not picked up soon after the rear edge of the preceding sheet 1-A passes through the pickup roller 2. After the preceding sheet 1-A passes through the feeding nip portion and the driving shaft 19 is driven for a predetermined time, the projection 19*a* abuts against the first surface 2*a*. The rotation of the driving shaft 19 is transmitted to the pickup roller 2, and the pickup roller 2 starts to rotate. This operation generates a time lag until the succeeding sheet 1-B is picked up.

A description will be provided with reference to a state ST4 of FIG. 2. A state in which the pickup roller 2 starts to rotate, and picks up the succeeding sheet 1-B is shown. Due to a factor such as the responsiveness of the sensor, the sheet detection sensor 16 requires a predetermined interval or more between the successive printing sheets 1 to detect the edges of the printing sheets 1 more correctly. As described above, in this embodiment, with the arrangement including the driving shaft 19 and pickup roller 2, a time lag is generated until the succeeding sheet 1-B is picked up and the interval is ensured.

That is, it is necessary to separate the leading edge of the succeeding sheet 1-B from the rear edge of the preceding sheet 1-A by a predetermined distance to provide a predetermined time interval from when the sheet detection sensor 16 detects the rear edge of the preceding sheet 1-A until it detects the leading edge of the succeeding sheet 1-B. To achieve this, the angle of the concave portion 2*c* of the pickup roller 2 is set to about 70°.

A description will be provided with reference to a state ST5 of FIG. 2. The succeeding sheet 1-B picked up by the pickup roller 2 is conveyed by the feeding roller 3. At this time, the preceding sheet 1-A undergoes an image forming operation by the printhead 7 based on the printing data. When the sheet detection sensor 16 detects the leading edge of the succeeding sheet 1-B, the feeding motor 206 is switched to high-speed driving again. That is, the pickup roller 2 and feeding roller 3 rotate at 20 inches/sec.

A description will be provided with reference to a state ST6 of FIG. 2. The sheet pressing lever 17 presses the rear edge of the preceding sheet 1-A downward, as shown in the state ST5 of FIG. 2. The succeeding sheet 1-B is moved at a speed higher than that at which the preceding sheet 1-A moves downstream by the printing operation of the printhead 7. This makes it possible to form a state in which the leading edge of the succeeding sheet 1-B overlaps the rear edge of the preceding sheet 1-A (the state ST6 of FIG. 2). Since the preceding sheet 1-A undergoes the printing operation based on the printing data, it is intermittently conveyed by the conveyance roller 5. On the other hand, after the sheet detection sensor 16 detects the leading edge of the succeeding sheet 1-B, the succeeding sheet 1-B can catch up with the preceding sheet 1-A by continuously rotating the feeding roller 3 at 20 inches/sec.

A description will be provided with reference to a state ST7 of FIG. 3. After forming an overlap state in which the leading edge of the succeeding sheet 1-B overlaps the rear edge of the preceding sheet 1-A, the succeeding sheet 1-B is conveyed by the feeding roller 3 until the leading edge of the succeeding sheet 1-B stops at a predetermined position upstream of the conveyance nip portion.

The position of the leading edge of the succeeding sheet 1-B is calculated from the rotation amount of the feeding roller 3 after the sheet detection sensor 16 detects the leading edge of the succeeding sheet 1-B, and controlled based on the calculation result. At this time, the preceding sheet 1-A undergoes an image forming operation based on the printing data by the printhead 7.

A description will be provided with reference to a state ST8 of FIG. 3. When the conveyance roller 5 stops to perform the image forming operation of the preceding sheet 1-A (in this example, the conveyance roller 5 stops to perform the image forming operation of the last row), the feeding roller 3 is driven. This makes the leading edge of the printing sheet 1-B abut against the conveyance nip portion, thereby performing the skew correction operation of the succeeding sheet 1-B.

A description will be provided with reference to a state ST9 of FIG. 3. When the image forming operation of the preceding sheet 1-A ends, it is possible to perform alignment of the succeeding sheet 1-B while keeping the state in which the succeeding sheet 1-B overlaps the preceding sheet 1-A by rotating the conveyance roller 5 by a predetermined amount. The printing operation of the succeeding sheet 1-B starts based on the printing data. When the succeeding sheet 1-B is intermittently conveyed for the printing operation, the preceding sheet 1-A is also intermittently conveyed, and is finally discharged outside the printing apparatus by the discharge roller 9.

When alignment of the succeeding sheet 1-B is performed, the feeding motor 206 is switched to low-speed driving again. That is, the pickup roller 2 and feeding roller 3 rotate at 7.6 inches/sec. If there is printing data even after the succeeding sheet 1-B, the process returns to the state ST4 of FIG. 2 to pick up the third printing sheet.

As described above, it is possible to continuously perform a printing operation for the plurality of printing sheets 1 while performing successive overlapped conveyance.

Figure 6B:
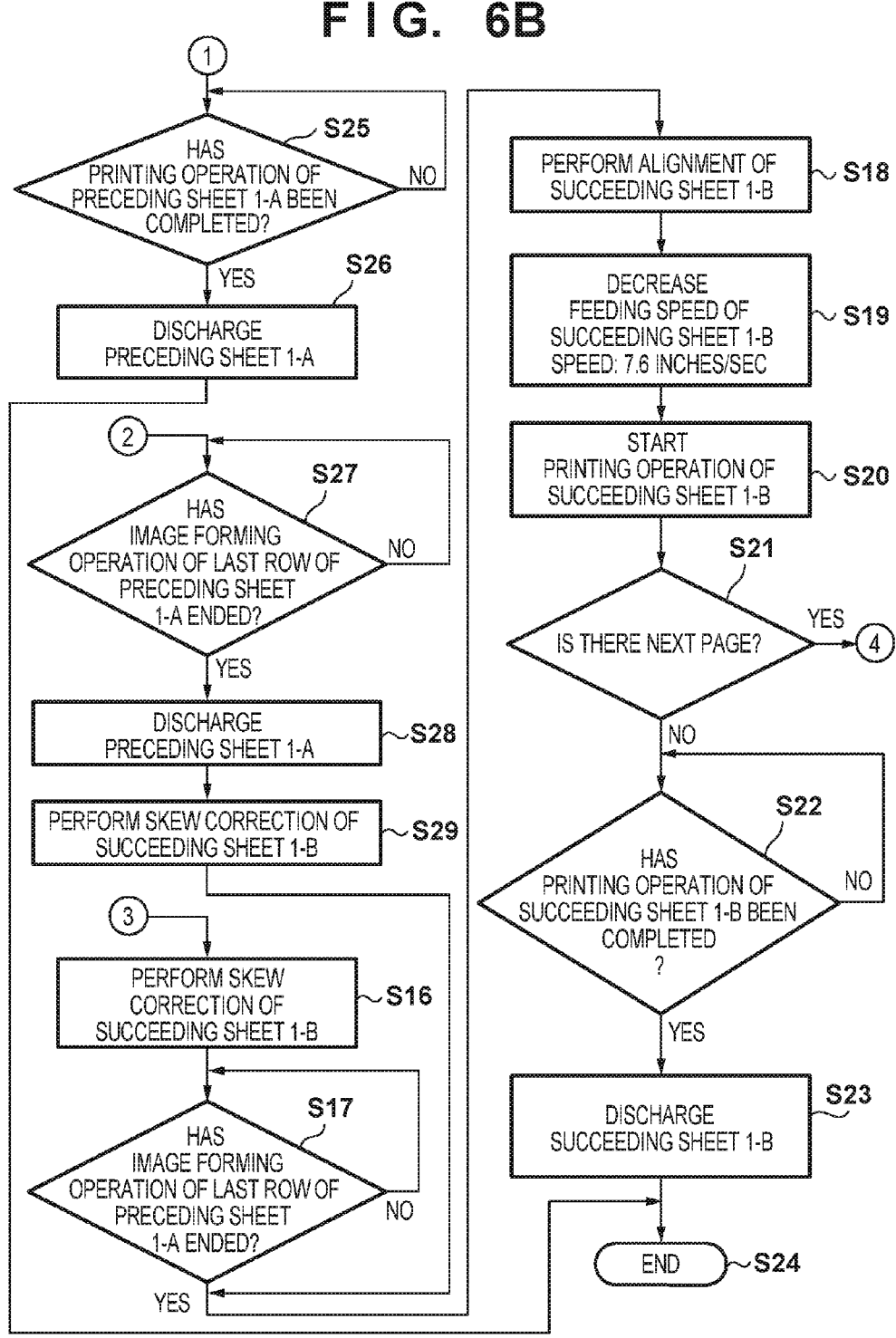

An example of processing by the MPU 201 to execute successive overlapped conveyance described above will be explained. FIGS. 6A and 6B are flowcharts showing successive overlapped conveyance processing executed by the MPU 201. In this specification, the flowcharts executed in the printing apparatus are implemented by reading out a program regarding processing of the flowcharts by the MPU 201 from the ROM or HDD, and executing it.

When the information processing apparatus 214 transmits a printing start instruction via the I/F unit 213, the printing apparatus 100 starts a printing operation in step S1, and starts the feeding operation of the preceding sheet 1-A in step S2. More specifically, the MPU 201 drives the feeding motor 206 at low speed. The pickup roller 2 rotates at 7.6 inches/sec. The pickup roller 2 picks up the preceding sheet 1-A, and the feeding roller 3 feeds the preceding sheet 1-A toward the printhead 7.

In step S3, the sheet detection sensor 16 detects the leading edge of the preceding sheet 1-A. When the sheet detection sensor 16 detects the leading edge of the preceding sheet 1-A, the printing apparatus 100 switches the feeding motor 206 to high-speed driving in step S4. That is, the pickup roller 2 and feeding roller 3 rotate at 20 inches/sec. the printing apparatus 100 controls the rotation amount of the feeding roller 3 after the sheet detection sensor 16 detects the leading edge of the preceding sheet 1-A. By this processing, the printing apparatus 100 makes the leading edge of the preceding sheet 1-A abut against the conveyance nip portion to perform the skew correction operation of the preceding sheet 1-A In step S5.

In step S6, the printing apparatus 100 performs alignment of the preceding sheet 1-A based on the printing data. That is, the printing apparatus 100 conveys the preceding sheet 1-A to a printing start position with reference to the position of the conveyance roller 5 based on the printing data by controlling the rotation amount of the conveyance roller 5. The printing apparatus 100 switches the feeding motor 206 to low-speed driving in step S7, and starts a printing operation by discharging ink from the printhead 7 to the preceding sheet 1-A in step S8.

More specifically, a conveyance operation of intermittently conveying the preceding sheet 1-A by the conveyance roller 5 and an image forming operation (ink discharge operation) of discharging ink from the printhead 7 by moving the carriage 10 are repeated. By this processing, the printing operation of the preceding sheet 1-A is performed. The printing apparatus 100 intermittently drives the feeding motor 206 at low speed in synchronization with the operation of intermittently conveying the preceding sheet 1-A by the conveyance roller 5. That is, the pickup roller 2 and feeding roller 3 intermittently rotate at 7.6 inches/sec.

In step S9, the printing apparatus 100 determines whether there is printing data of the next page. If there is no printing data of the next page, the process advances to step S25. Upon completion of the printing operation of the preceding sheet 1-A in step S25, the printing apparatus 100 discharges the preceding sheet 1-A in step S26, thereby terminating the printing operation.

If there is printing data of the next page, the printing apparatus 100 starts the feeding operation of the succeeding sheet 1-B in step S10. More specifically, the printing apparatus 100 causes the pickup roller 2 to pick up the succeeding sheet 1-B, and the feeding roller 3 to feed the succeeding sheet 1-B toward the printhead 7. The pickup roller 2 rotates at 7.6 inches/sec. As described above, since the large concave portion 2c of the pickup roller 2 is provided with respect to the projection 19a of the driving shaft 19, the succeeding sheet 1-B is fed while having a predetermined interval with respect to the rear edge of the preceding sheet 1-A.

In step S11, the sheet detection sensor 16 detects the leading edge of the succeeding sheet 1-B. When the sheet detection sensor 16 detects the leading edge of the succeeding sheet 1-B, the printing apparatus 100 switches the feeding motor 206 to high-speed driving in step S12. That is, the pickup roller 2 and feeding roller 3 rotate at 20 inches/sec. In step S13, the printing apparatus 100 controls the rotation amount of the feeding roller 3 after the sheet detection sensor 16 detects the leading edge of the succeeding sheet 1-B. By this processing, the succeeding sheet 1-B is conveyed so that its leading edge is at a position a predetermined amount before the conveyance nip portion in step S13. The preceding sheet 1-A is intermittently conveyed based on the printing data. Continuously driving the feeding motor 206 at high speed forms the overlap state in which the leading edge of the succeeding sheet 1-B overlaps the rear edge of the preceding sheet 1-A.

In step S14, the printing apparatus 100 determines whether predetermined conditions are satisfied. The predetermined conditions are conditions for determining whether to perform successive overlapped conveyance. Details will be described later.

If the predetermined conditions are satisfied, the printing apparatus 100 determines in step S15 whether the image forming operation of the preceding sheet 1-A has started. If the printing apparatus 100 determines that the image forming operation has started, the process advances to step S16; otherwise, the process stands by until the image forming operation starts. In step S16, the printing apparatus 100 makes the leading edge of the succeeding sheet 1-B abut against the conveyance nip portion while keeping the overlap state, thereby performing the skew correction operation of the succeeding sheet 1-B. If the printing apparatus 100 determines in step S17 that the image forming operation of the last row of the preceding sheet 1-A has ended, it performs alignment of the succeeding sheet 1-B while keeping the overlap state in step S18.

If the printing apparatus 100 determines in step S14 that the predetermined conditions are not satisfied, it cancels the overlap state and performs alignment of the succeeding sheet 1-B. More specifically, if it is determined in step S27 that the image forming operation of the last row of the preceding sheet 1-A has ended, the discharge operation of the preceding sheet 1-A is performed in step S28. During this operation, the feeding motor 206 is not driven, and thus the succeeding sheet 1-B stops while its leading edge is at the position the predetermined amount before the conveyance nip portion. Since the preceding sheet 1-A is discharged, the overlap state is canceled. The printing apparatus 100 makes the leading edge of the succeeding sheet 1-B abut against the conveyance nip portion to perform the skew correction operation of the succeeding sheet 1-B in step S29, and performs alignment of the succeeding sheet 1-B in step S18.

The printing apparatus 100 switches the feeding motor 206 to low-speed driving in step S19, and starts a printing operation by discharging ink from the printhead 7 to the succeeding sheet 1-B in step S20. More specifically, the printing operation of the succeeding sheet 1-B is performed by repeating a conveyance operation of intermittently conveying the succeeding sheet 1-B by the conveyance roller 5 and an image forming operation (ink discharge operation) of discharging ink from the printhead 7 by moving the carriage 10. The printing apparatus 100 intermittently drives the feeding motor 206 at low speed in synchronization with the operation of intermittently conveying the succeeding sheet 1-B by the conveyance roller 5. That is, the pickup roller 2 and feeding roller 3 intermittently rotate at 7.6 inches/sec.

In step S21, the printing apparatus 100 determines whether there is printing data of the next page. If there is printing data of the next page, the process returns to step S10. If there is no printing data of the next page, when the image forming operation of the succeeding sheet 1-B is complete in step S22, the printing apparatus 100 performs the discharge operation of the succeeding sheet 1-B in step S23, and ends the printing operation in step S24.

Figure 8:
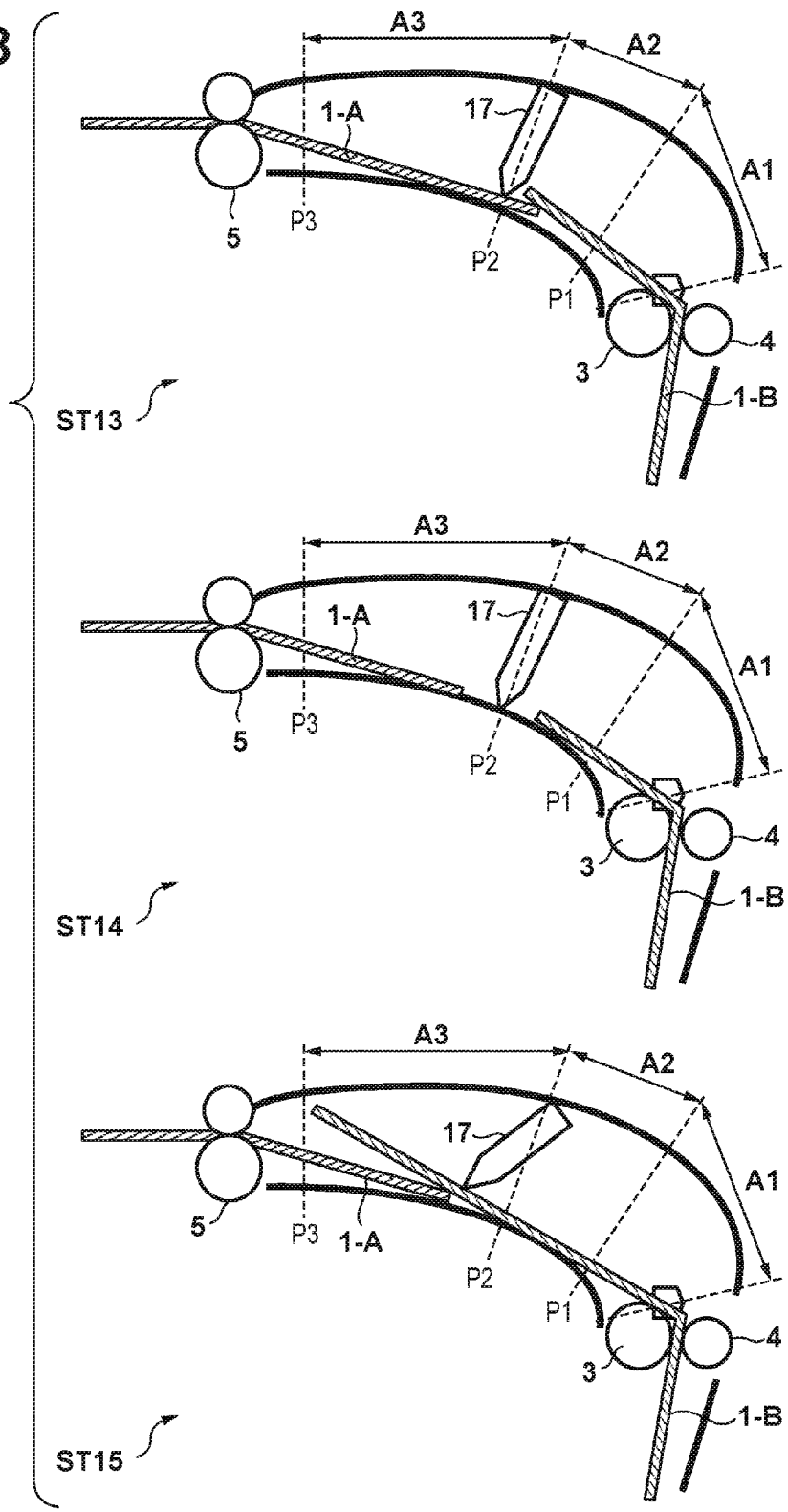
FIG. 8 is a view for explaining the operation of making the succeeding sheet overlap the preceding sheet.

The operation, described in steps S12 and S13 of FIG. 6A, of forming the overlap state in which the leading edge of the succeeding sheet 1-B overlaps the rear edge of the preceding sheet 1-A will be explained. FIGS. 7 and 8 are views for explaining the operation of making the succeeding sheet 1-B overlap the preceding sheet 1-A according to this embodiment. FIGS. 7 and 8 are enlarged views each showing a portion between the feeding nip portion formed by the feeding roller 3 and feeding driven roller 4 and the conveyance nip portion formed by the conveyance roller 5 and pinch roller 6.

Three states in a process of conveying the printing sheets 1 by the conveyance roller 5 and feeding roller 3 will be sequentially described. The first state in which an operation of making the succeeding sheet 1-B chase the preceding sheet 1-A is performed will be described with reference to states ST11 and ST12 of FIG. 7. The second state in which an operation of making the succeeding sheet 1-B overlap the preceding sheet 1-A is performed will be described with reference to states ST13 and ST14 of FIG. 8. The third state in which it is determined whether to perform the skew correction operation of the succeeding sheet 1-B while keeping the overlap state will be described with reference to a state ST15 of FIG. 8.

In the state ST11 of FIG. 7, the feeding roller 3 is controlled to convey the succeeding sheet 1-B, and the sheet detection sensor 16 detects the leading edge of the succeeding sheet 1-B. A section from the sheet detection sensor 16 to a position P1 at which the succeeding sheet 1-B can be made to overlap the preceding sheet 1-A is defined as a first section A1. In the first section A1, an operation of making the leading edge of the succeeding sheet 1-B chase the rear edge of the preceding sheet 1-A is performed. The position P1 is decided based on the arrangement of the mechanism.

In the first state, the chasing operation may stop in the first section A1. If, as shown in the state ST12 of FIG. 7, the leading edge of the succeeding sheet 1-B passes the rear edge of the preceding sheet 1-A before the position P1, the operation of making the succeeding sheet 1-B overlap the preceding sheet 1-A is not performed.

In the state ST13 of FIG. 8, a section from the position P1 to a position P2 at which the sheet pressing lever 17 is provided is defined as a second section A2. In the second section A2, the operation of making the succeeding sheet 1-B overlap the preceding sheet 1-A is performed.

In the second state, the operation of making the succeeding sheet overlap the preceding sheet may stop in the second section A2. If, as shown in the state ST14 of FIG. 8, the leading edge of the succeeding sheet 1-B cannot catch up with the rear edge of the preceding sheet 1-A within the second section A2, it is impossible to perform the operation of making the succeeding sheet 1-B overlap the preceding sheet 1-A.

In the state ST15 of FIG. 8, a section from the above-described position P2 to a position P3 is defined as a third section A3. The position P3 is the position of the leading edge of the succeeding sheet 1-B when the succeeding sheet 1-B stops in step S13 of FIG. 6A. While the succeeding sheet 1-B overlaps the preceding sheet 1-A, the succeeding sheet 1-B is conveyed so that its leading edge reaches the position P3. In the third section A3, it is determined whether to perform alignment of the succeeding sheet 1-B by making it abut against the conveyance nip portion while keeping the overlap state. That is, it is determined whether to perform alignment of the succeeding sheet by executing a skew correction operation while keeping the overlap state or to perform alignment of the succeeding sheet by canceling the overlap state and performing a skew correction operation.

Figure 9:
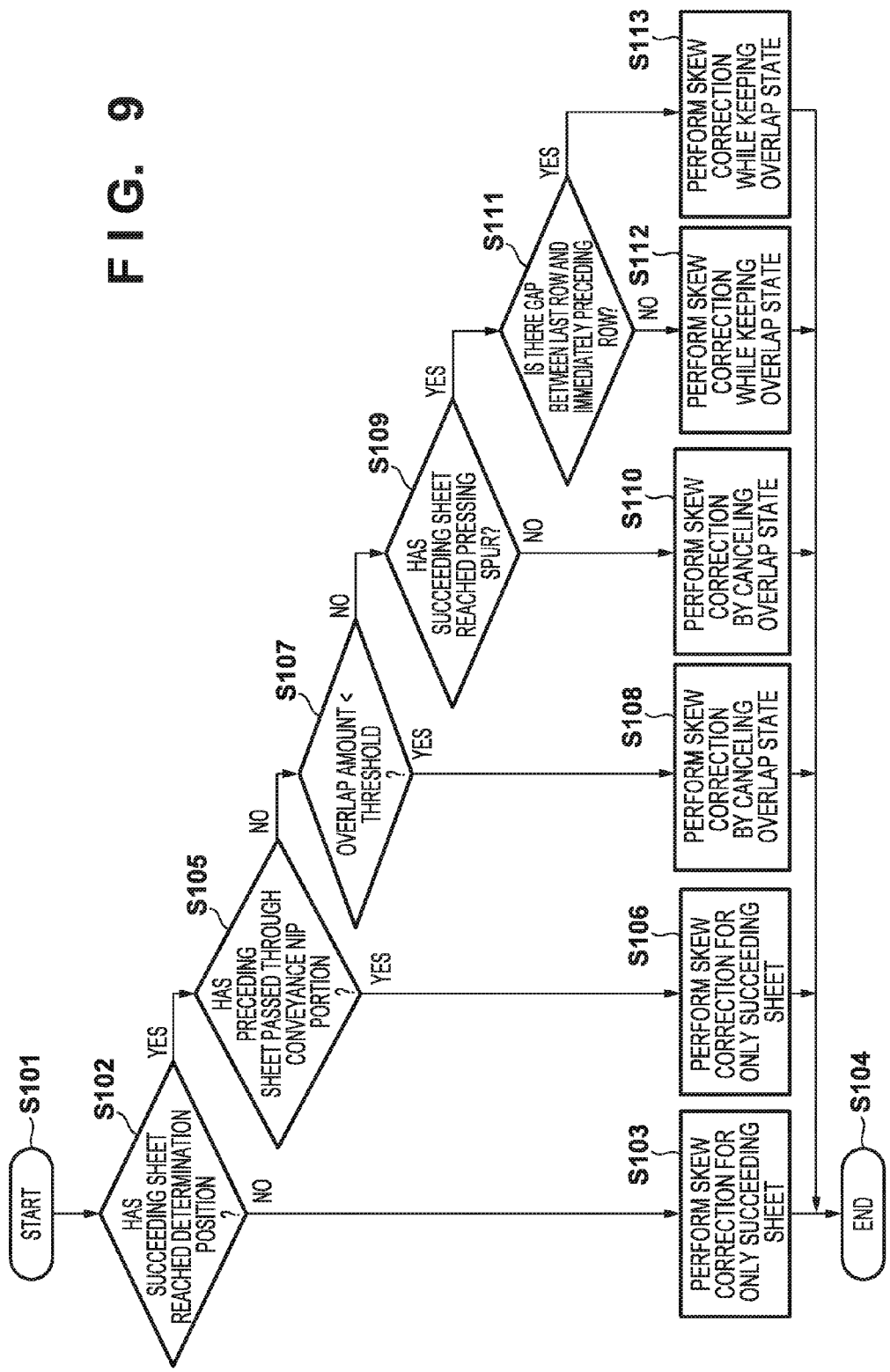
FIG. 9 is a flowchart illustrating an example of processing executed by the control unit of the printing apparatus shown in FIG. 1.

FIG. 9 is a flowchart for explaining the skew correction operation of the succeeding sheet according to this embodiment. The processing of determining whether the predetermined conditions are satisfied, which has been explained in step S14 of FIG. 6A, will be described.

The operation of determining whether to perform the first skew correction operation or the second skew correction operation will be described. The first skew correction operation is an operation of performing skew correction by making the leading edge of the succeeding sheet 1-B abut against the conveyance nip portion while keeping the overlap state between the preceding sheet 1-A and the succeeding sheet 1-B. The second skew correction operation is an operation of performing skew correction by canceling the overlap state between the preceding sheet 1-A and the succeeding sheet 1-B and then making the leading edge of the succeeding sheet 1-B abut against the conveyance nip portion.

In step S101, the operation starts. In step S102, the printing apparatus 100 determines whether the leading edge of the succeeding sheet 1-B has reached a determination position (the position P3 in the state of FIG. 8). If the printing apparatus 100 determines that the leading edge of the succeeding sheet 1-B has not reached the determination position (NO in step S102), it does not know whether the leading edge of the succeeding sheet 1-B abuts against the conveyance nip portion by conveying the succeeding sheet 1-B by a predetermined amount. Thus, the printing apparatus 100 decides a skew correction operation for only the succeeding sheet (step S103), and terminates the determination operation (step S104). That is, after the rear edge of the preceding sheet 1-A passes through the conveyance nip portion, the printing apparatus 100 performs a skew correction operation by making only the succeeding sheet 1-B abut against the conveyance nip portion, and then performs alignment of only the succeeding sheet 1-B.

On the other hand, if the printing apparatus 100 determines that the leading edge of the succeeding sheet 1-B has reached the determination position P3 (YES in step S102), it determines whether the rear edge of the preceding sheet 1-A has passed through the conveyance nip portion (step S105). If the printing apparatus 100 determines that the rear edge of the preceding sheet 1-A has passed through the conveyance nip portion (YES in step S105), the succeeding sheet does not overlap the preceding sheet. Thus, the printing apparatus 100 decides a skew correction operation for only the succeeding sheet 1-B (step S106). That is, the printing apparatus 100 performs a skew correction operation by making only the succeeding sheet 1-B abut against the conveyance nip portion, and then performs alignment of only the succeeding sheet 1-B.

On the other hand, if the printing apparatus 100 determines that the rear edge of the preceding sheet 1-A has not passed through the conveyance nip portion (NO in step S105), it determines whether the overlap amount of the rear edge of the preceding sheet 1-A and the leading edge of the succeeding sheet 1-B is smaller than a threshold (step S107). The position of the rear edge of the preceding sheet 1-A is updated along with the printing operation of the preceding sheet 1-A. The position of the leading edge of the succeeding sheet 1-B is at the above-described determination position. That is, the overlap amount decreases along with the printing operation of the preceding sheet 1-A. If the printing apparatus 100 determines that the overlap amount is smaller than the threshold (YES in step S107), it cancels the overlap state, and decides a skew correction operation for only the succeeding sheet 1-B (step S108). That is, after the image forming operation of the preceding sheet 1-A ends, the succeeding sheet 1-B is not conveyed together with the preceding sheet 1-A. More specifically, the printing apparatus 100 causes the conveyance motor 205 to drive the conveyance roller 5 and convey the preceding sheet 1-A. However, the feeding roller 3 is not driven. Therefore, the overlap state is canceled. Furthermore, the printing apparatus 100 performs a skew correction operation by making only the succeeding sheet 1-B abut against the conveyance nip portion, and then performs alignment of only the succeeding sheet 1-B.

If the printing apparatus 100 determines that the overlap amount is equal to or larger than the threshold (NO in step S107), it determines whether the succeeding sheet 1-B will reach the pressing spur 12 when alignment of the succeeding sheet 1-B is performed (step S109). If the printing apparatus 100 determines that the succeeding sheet 1-B will not reach the pressing spur 12 (NO in step S109), it cancels the overlap state and decides a skew correction operation for only the succeeding sheet (step S110). That is, upon the end of the image forming operation of the preceding sheet 1-A, the printing apparatus 100 does not convey the succeeding sheet 1-B together with the preceding sheet 1-A. More specifically, the conveyance motor 205 drives the conveyance roller 5 to convey the preceding sheet 1-A. However, the feeding roller 3 is not driven. Therefore, the overlap state is canceled. Furthermore, the printing apparatus 100 performs a skew correction operation by making only the succeeding sheet 1-B abut against the conveyance nip portion, and then performs alignment of only the succeeding sheet 1-B.

If the printing apparatus 100 determines that the succeeding sheet 1-B will reach the pressing spur 12 (YES in step S109), it determines whether there is a gap between the last row of the preceding sheet and the row immediately preceding the last row (step S111). If the printing apparatus 100 determines that there is no gap (NO in step S111), it cancels the overlap state and decides a skew correction operation for only the succeeding sheet 1-B (step S112). The skew correction operation of the succeeding sheet 1-B may influence the image forming operation of the preceding sheet 1-A. If there is no gap, the influence may be conspicuous, and thus the overlap state is canceled to perform a skew correction operation for only the succeeding sheet 1-B.

If the printing apparatus 100 determines that there is a gap (YES in step S111), it performs the skew correction operation of the succeeding sheet 1-B while keeping the overlap state (step S113), and then performs alignment of the succeeding sheet 1-B. That is, after the start of the image forming operation of the last row of the preceding sheet 1-A, the succeeding sheet 1-B is made to abut against the conveyance nip portion while the succeeding sheet 1-B overlaps the preceding sheet 1-A. Upon the end of the image forming operation of the last row, the conveyance roller 5 and the feeding roller 3 are rotated by driving the feeding motor 206 together with the conveyance motor 205, and alignment of the succeeding sheet 1-B is performed while it overlaps the preceding sheet 1-A.

In this manner, the operation of determining whether to keep or cancel the overlap state between the preceding sheet 1-A and the succeeding sheet 1-B is performed.

As described above, according to the above embodiment, at the start of feeding of the succeeding sheet 1-B, the printing apparatus 100 need not confirm whether to execute successive overlapped conveyance. This is advantageous in that even if the marginal amount of the succeeding sheet 1-B is uncertain at the start of feeding of the succeeding sheet 1-B, it is possible to execute successive overlapped conveyance when the marginal amount is confirmed.

Furthermore, according to the above embodiment, the synchronous and asynchronous operations of the feeding motor 206 and the conveyance motor 205 are switched when performing the printing operation of the preceding sheet 1-A by the printhead 7. More specifically, before the sheet detection sensor 16 detects the leading edge of the succeeding sheet 1-B, the feeding motor 206 is driven in synchronism with the conveyance motor 205. On the other hand, after the sheet detection sensor 16 detects the leading edge of the succeeding sheet, the feeding motor 206 is continuously driven. Continuously driving the feeding motor makes it possible to perform a chasing operation to make the succeeding sheet 1-B overlap the preceding sheet 1-A, and to adjust the overlap amount of the preceding and succeeding printing sheets 1 in successive overlapped conveyance.

Note that the succeeding sheet 1-B overlaps the upper side of the preceding sheet 1-A at the time of successive overlapped conveyance in the above embodiment, but the succeeding sheet 1-B may overlap the lower side of the preceding sheet 1-A. Also, in the above embodiment, the preceding sheet 1-A and the succeeding sheet 1-B are fed while having an interval therebetween. An arrangement of conveying the sheets while they overlap each other at the time of feeding can be adopted.

<Calculation of Margin Amount and Setting of Overlap Amount>

When performing the above-described successive overlapped conveyance, the overlap amount between the preceding and succeeding printing sheets 1 needs to be set. An example of calculation of the leading-edge-side and rear-edge-side margin amounts of the printing sheets 1, and an example of setting of the overlap amount of the preceding and succeeding printing sheets 1 will be explained with reference to FIGS. 10 and 11A.

Figure 10:
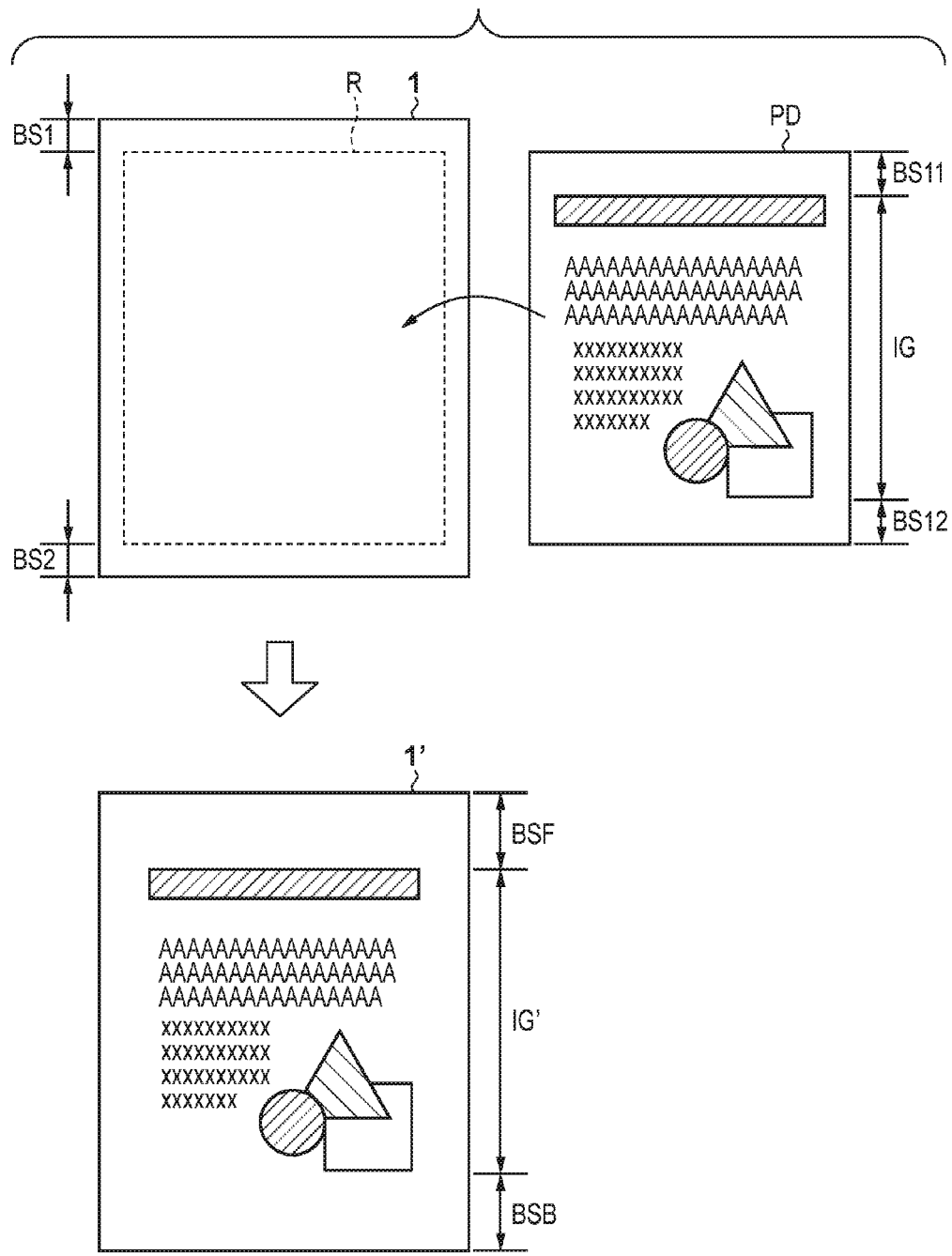
FIG. 10 is a view for explaining a margin amount.

FIG. 10 shows an unprinted printing sheet 1, an image of printing data PD to be printed on the printing sheet 1, and a printing sheet 1' after printing the printing data PD on the printing sheet 1.

The example of FIG. 10 assumes a case in which a printable region R is set on the printing sheet 1, and margins of margin amounts BS1 and BS2 exist on the leading edge side and rear edge side. Also, this example assumes a case in which the printing data PD includes a region IG including an image, and margins of margin amounts BS11 and BS12 exist on the leading edge side and rear edge side. Note that the margin amount is a width of the printing sheet 1 in the conveyance direction at the time of printing.

The printing apparatus 100 lays out the printing data PD on the printing sheet 1, and prints the image, creating the printing sheet 1'. The printing sheet 1' has a margin of a leading-edge-side margin amount BSF and a margin of a rear-edge-side margin amount BSB. Here, BSF=BS1+BS11, and BSB=BS2+BS12.

Figure 11B:
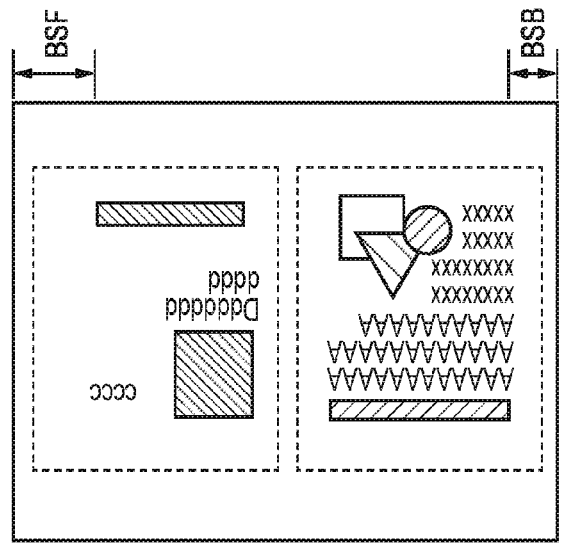
FIG. 11B is a view for explaining a margin amount when a plurality of logical pages are laid out on one printing sheet.
Figure 11A:
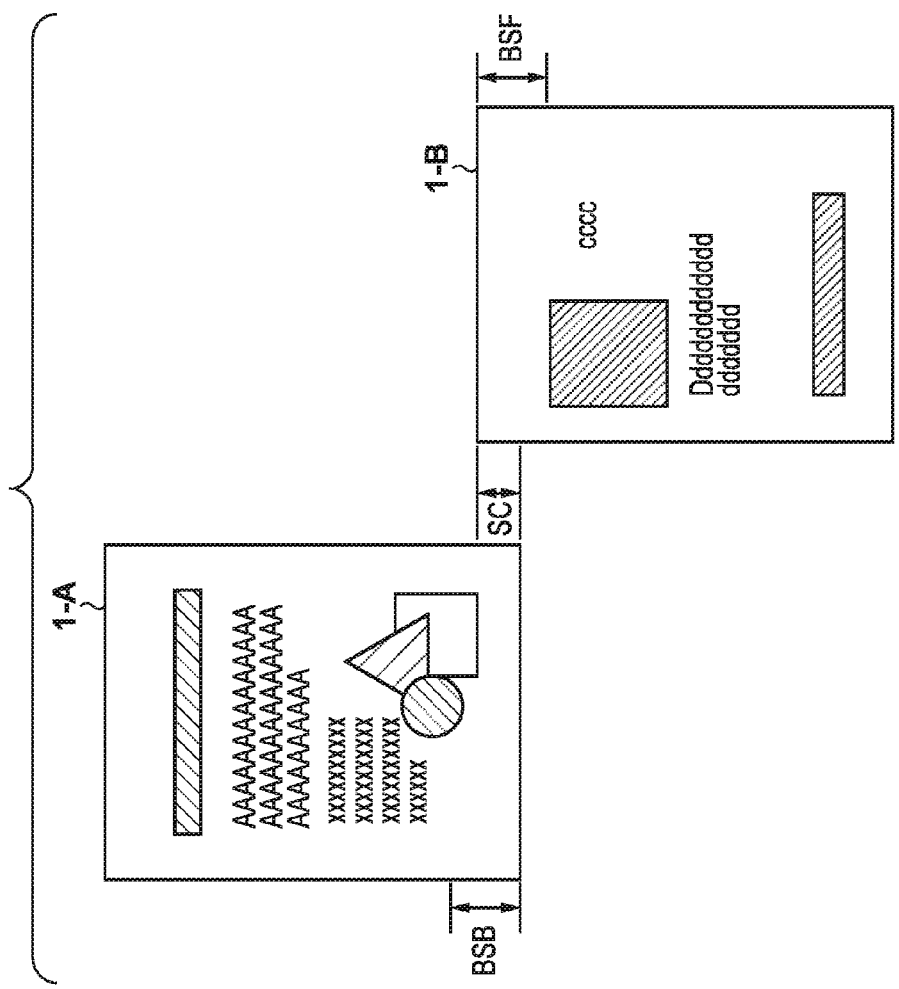
FIG. 11A is a view for explaining an overlap amount.

As shown in FIG. 11A, an overlap amount SC of the preceding and succeeding printing sheets 1 can be set from the rear-edge-side margin amount BSB of the preceding sheet 1-A and the leading-edge-side margin amount BSF of the succeeding sheet 1-B.

When laying out printing data of a plurality of logical pages on one printing sheet 1 (performing Nin1 printing), the margin amount is calculated with reference to printing data after layout. FIG. 11B exemplifies a case in which printing data of two logical pages are laid out on one printing sheet 1. In this example, the margin amounts BSF and BSB are calculated from the left or right margin amount of the printing data and the margin amounts BS1 and BS2 of the printing sheet 1.

Figure 12:
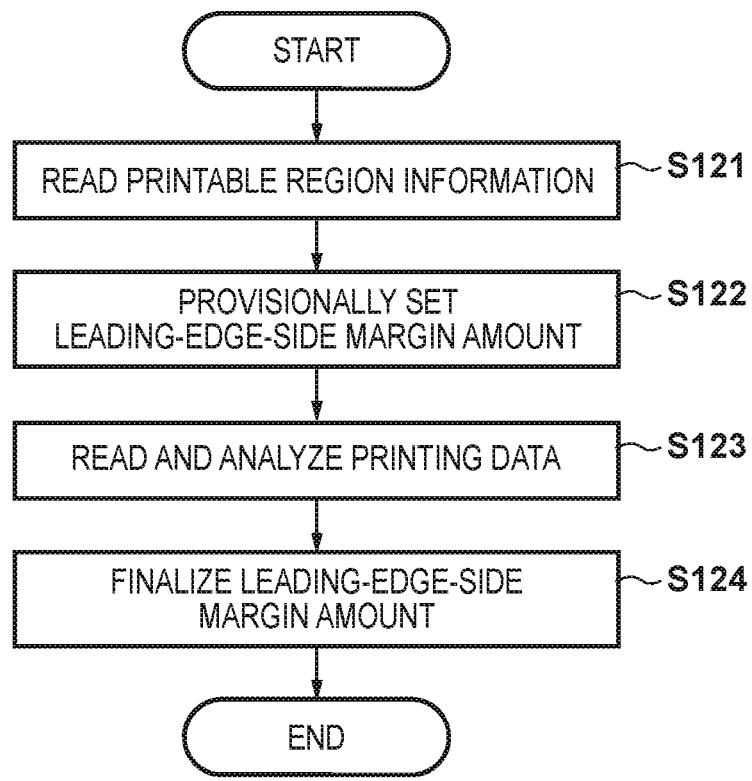
FIG. 12 is a flowchart illustrating an example of processing executed by the control unit of the printing apparatus in FIG. 1.

The margin amounts BS1 and BS2 can take values set in advance in accordance with the size of the printing sheet 1 or the like. In contrast, the margin amounts BS11 and BS12 are amounts specific to each printing data PD, and cannot be calculated unless the printing data PD is analyzed. That is, the overlap amount SC cannot be set unless the printing data PD is analyzed. An example in which the leading-edge-side margin amount BSF is calculated in the printing apparatus 100 will be explained. FIG. 12 is a flowchart showing an example of processing executed by the control unit of the printing apparatus 100.

In step S121, the control unit reads printable region information of the printing sheet 1. The printable region information is, for example, coordinates indicating the region R in FIG. 10. For example, the printable region information can be stored in the ROM 202, or received and loaded from the information processing apparatus 214. By the processing in step S121, BS1 in FIG. 10 is specified. In step S122, the leading-edge-side margin amount BSF is provisionally set in BS1 specified in step S121. In step S123, printing data received from the information processing apparatus 214 is read and analyzed to calculate the margin amount BS11. The calculation of the margin amount BS11 suffices to use a known margin amount detection technique.

In step S124, the margin amount BS11 calculated in step S123 is added to the provisionally set margin amount BSF, and the value after addition is set as the final margin amount BSF. As a result, the leading-edge-side margin amount BSF can be finalized. Note that the rear-edge-side margin amount BSB can also be finalized by the same processing.

This processing requires loading and analysis of printing data in step S123. When the storage capacity of the RAM 203 of the printing apparatus 100 is relatively small, the printable printing data amount also becomes small. When successively printing on the plurality of printing sheets 1, a free storage area for storing printing data of a succeeding printing sheet may not be prepared before the completion of printing of the preceding printing sheet 1. If no free storage area can be prepared, calculation of the margin amount BSF is delayed and setting of the overlap amount SC is also delayed. Successive overlapped conveyance also depends on the processing capability of the MPU 201. That is, a case in which smooth successive overlapped conveyance control cannot be executed may arise depending on the processing capability of the hardware of the printing apparatus 100.

To solve this, the embodiment employs an arrangement in which the information processing apparatus 214 calculates the margin amount BS11 and notifies in advance the printing apparatus 100 of it. Even a low-end printing apparatus 100 can more quickly calculate the margin amount BSF of the printing sheet 1' and more quickly set the overlap amount SC. Note that the information processing apparatus 214 may calculate only the margin amount BS11, but calculates even the margin amount BS12 in the following embodiment.

<Pre-Notification of Margin Amount>
<Example of Processing of Information Processing Apparatus>

An example of processing of the information processing apparatus 214 regarding calculation of the margin amounts BS11 and BS12 will be explained.

FIG. 13 shows an example of a setting screen provided by the printer driver 2141. The printer driver 2141 can receive a printing condition instruction from the user via the setting screen (reception processing).

The printing conditions in the example of FIG. 13 include, for example, a paper size indicating the size of the preceding sheet 1, paper type, single-sided/double-sided setting, color/monochrome setting, printing quality, and frame setting. In the example of FIG. 13, a "transmit data to the printer now" operation mode (to be referred to as a sequential printing mode hereinafter) and a "transmit data after spooling data of all pages" operation mode (to be referred to as an all-page spool mode hereinafter) can be selected as the transmission setting of printing data. The successive printing mode is an operation mode in which while generating printing data in a predetermined unit, printing data is transmitted to the printing apparatus 100. The all-page spool mode is an operation mode in which after generating printing data of all pages, the printing data are transmitted to the printing apparatus 100.

For example, when a document, printing of which has been designated by the user, is very complicated, the time taken to generate printing data by the information processing apparatus 214 becomes long. In such a case, printing non-uniformity may arise from a wait for transfer of printing data from the information processing apparatus 214. In this case, the all-page spool mode is suitable.

Figure 14:
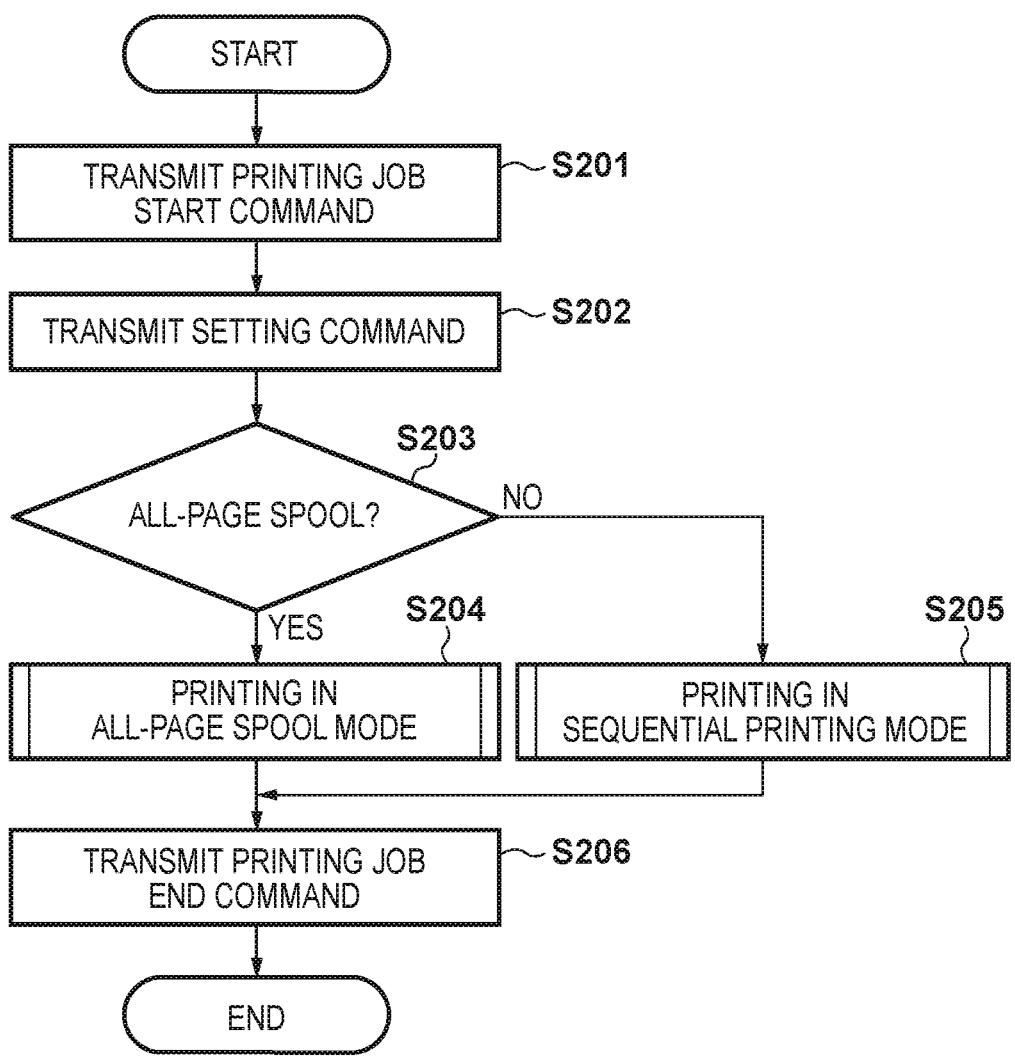
FIG. 14 is a flowchart illustrating an example of processing executed by an information processing apparatus according to the embodiment of the present invention.

FIG. 14 shows an example of processing of the information processing apparatus 214 when the user inputs a document printing instruction, and shows an example of processing executed by the printer driver 2141. Note that the flowchart executed in the information processing apparatus in this specification is implemented by reading out a program regarding processing of the flowchart by the CPU 214a from the HDD or ROM, and executing it.

First, the information processing apparatus 214 transmits a printing job start command and a setting command to the printing apparatus 100 (steps S201 and S202). The setting command includes, for example, information of printing conditions received via the printing setting screen of FIG. 13.

Then, the information processing apparatus 214 determines which of the all-page spool mode and the sequential printing mode has been selected (step S203). If the all-page spool mode has been selected, the information processing apparatus 214 executes printing processing in the all-page spool mode (step S204). If the sequential printing mode has been selected, the information processing apparatus 214 executes printing processing in the sequential printing mode (step S205). Details will be described later. If the transmission of printing data of all pages is completed in step S204 or S205, the information processing apparatus 214 transmits a printing job end command to the printing apparatus 100 (step S206), thereby terminating the processing of the printing job of one unit.

<Printing Processing in All-page Spool Mode>

Figure 15A:
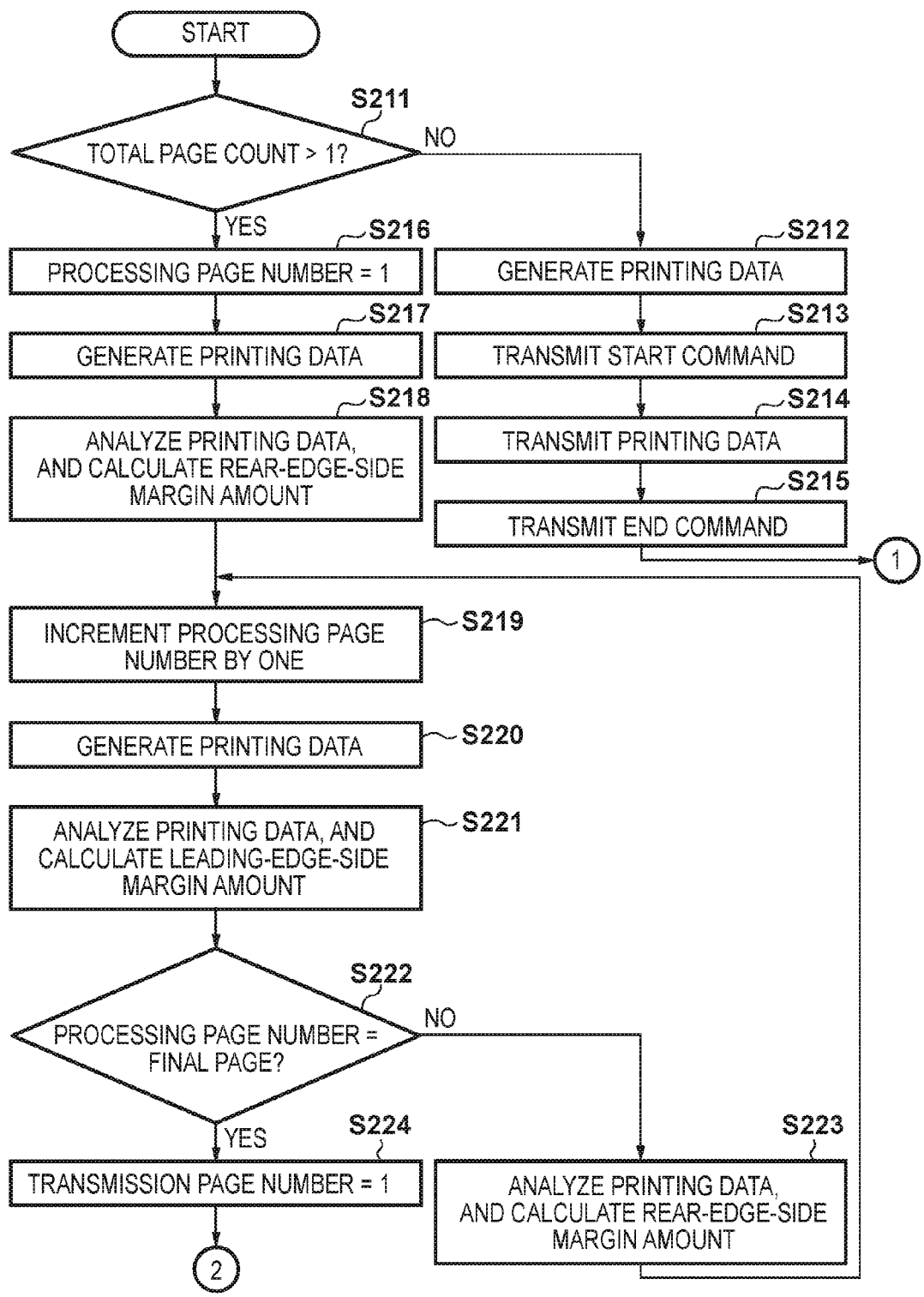
FIGS. 15A and 15B are flowcharts illustrating an example of processing executed by the information processing apparatus according to the embodiment of the present invention.
Figure 15B:
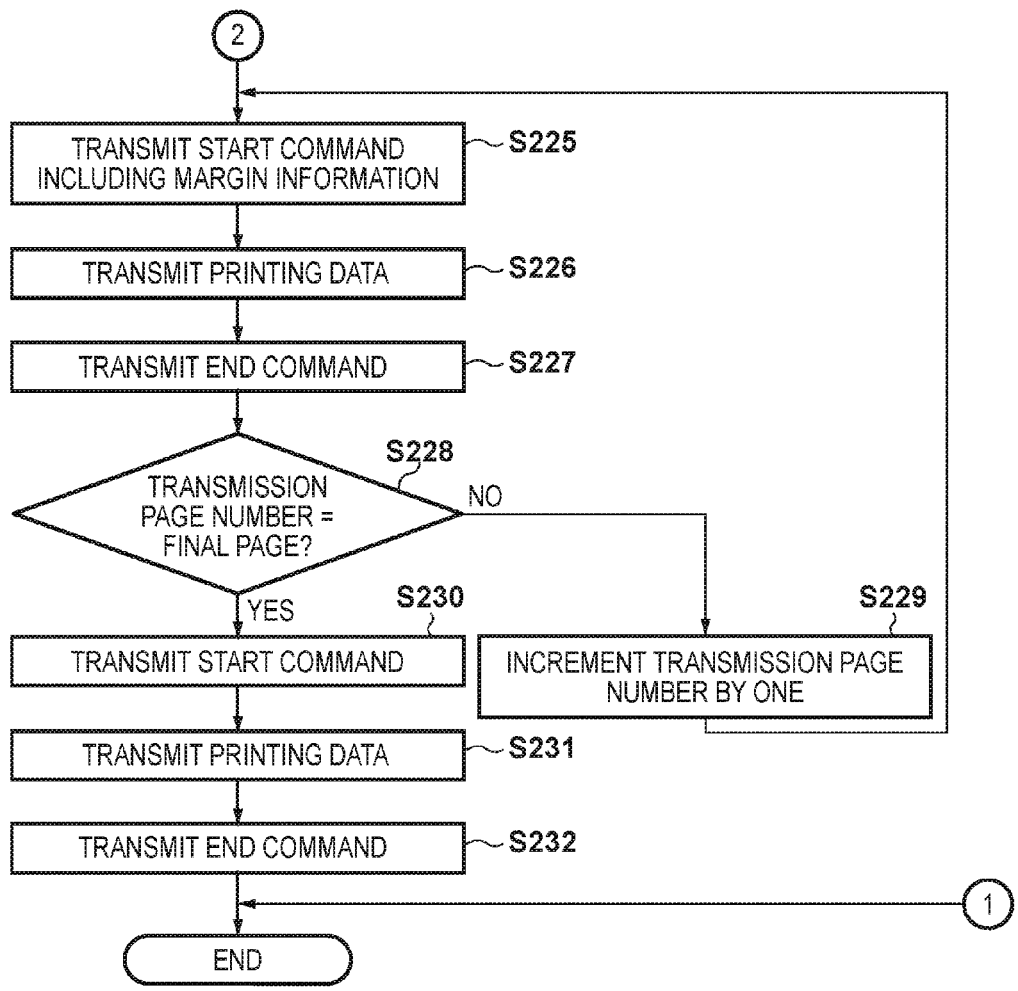

An example of printing processing in the all-page spool mode in step S204 will be explained with reference to FIGS. 15A and 15B.

First, the information processing apparatus 214 determines whether a printing job is a job to print on the printing sheets 1 of a plurality of pages (step S211). If YES in step S211, the process advances to step S216; if NO, the process advances to step S212.

Steps S212 to S215 are printing processing on the printing sheet 1 of one page. This printing processing is processing when successive overlapped conveyance of the printing sheets 1 is unnecessary. The information processing apparatus 214 generates printing data and saves it as a file in step S212, and transmits a start command to the printing apparatus 100 in step S213. In step S214, the information processing apparatus 214 transmits the printing data of one page generated in step S212 to the printing apparatus 100, and deletes the file. In step S215, the information processing apparatus 214 transmits an end command to the printing apparatus 100, thereby terminating the processing of one unit.

In this embodiment, transmission of a start command to designate the start of printing, transmission of printing data, and transmission of an end command to designate the end of printing are performed for each page of the printing sheet 1, as represented by steps S213 to S215.

Processing in step S216 and subsequent steps will be explained. In this embodiment, a processing page number and a transmission page number are used as information for managing printing data for each page of the printing sheet 1. The processing page number is a page number subjected to generation of printing data, and the transmission page number is a page number subjected to transmission of printing data.

In step S216, the information processing apparatus 214 sets "1" as the processing page number, generates printing data corresponding to the page (first page) of the current processing page number, and saves it as a file (step S217). In step S218, the information processing apparatus 214 analyzes the printing data generated in step S217, and calculates the margin amount BS12 positioned on the rear edge side of the printing sheet 1. That is, the rear-edge-side margin amount BS12 of printing data to be printed on the printing sheet 1 of the first page is calculated. The calculation result is saved as a file in association with the processing page number.

The calculation of the margin amount suffices to use a known margin amount detection technique. For example, the margin amount may be calculated by comparing, with a white pixel value, raster data of a page image generated by the system renderer of an OS running on the information processing apparatus 214. Alternatively, the margin amount may be calculated by comparing printing data with a white pixel value. If the printing target document is written in the PDL language or the like, the margin amount may be decided based on the result of analyzing the PDL language.

In step S219, the information processing apparatus 214 increments the processing page number by one. In step S220, the information processing apparatus 214 generates printing data corresponding to the page of the current processing page number, and saves it as a file. In step S221, the information processing apparatus 214 analyzes the printing data generated in step S220, and calculates the margin amount BS11 positioned on the leading edge side of the printing sheet 1. That is, the leading-edge-side margin amount BS11 of the printing data to be printed on the printing sheet 1 of the second page is calculated. The calculation result is saved as a file in association with the processing page number. As described above, the calculation of the margin amount suffices to use a known margin amount detection technique.

In step S222, the information processing apparatus 214 determines whether the current processing page number is the number of the final page of the current printing job. If YES in step S222, the process advances to step S224; if NO, the process advances to step S223. In step S223, the information processing apparatus 214 analyzes the printing data of the current processing page number generated in step S220, and calculates the margin amount BS12 positioned on the rear edge side of the printing sheet 1. That is, the rear-edge-side margin amount BS12 of printing data to be printed on the printing sheet 1 of the second page is calculated. The calculation result is saved as a file in association with the processing page number. As described above, the calculation of the margin amount suffices to use a known margin amount detection technique. After that, the process returns to step S219 to repeat the same processing.

By the above-described processing, the following pieces of information are obtained:
printing data of each page
the rear-edge-side margin amount BS12 of the first page
the leading-edge-side margin amounts BS11 and rear-edge-side margin amounts BS12 of the second page to a page immediately preceding the final page
the leading-edge-side margin amount BS11 of the final page Processing in step S224 and subsequent steps is processing of transmitting printing data, margin information, and the like to the printing apparatus 100. In step S224, the information processing apparatus 214 sets "1" as the transmission page number. In step S225, the information processing apparatus 214 transmits the margin information to the printing apparatus 100 together with a start command. The margin information is information based on the margin amount analysis results in steps S218, S221, and S223.

In this embodiment, the margin information includes the rear-edge-side margin amount BS12 of printing data corresponding to the page of the current transmission page number, and the leading-edge-side margin amount BS11 of printing data corresponding to a page next to the current transmission page number. Assuming that the current transmission page number is n (natural number: this also applies to the following description), the margin amount BS12 of printing data of the nth page and the margin amount BS11 of printing data of the (n+1)th page are transmitted together with a start command for the nth page. That is, the margin amount BS11 of printing data of the (n+1)th page is transmitted prior to transmission of the printing data of the (n+1)th page. The file of the transmitted margin amount is deleted at, for example, the end of the printing job.

In step S226, the information processing apparatus 214 transmits printing data corresponding to the page of the current transmission page number to the printing apparatus 100, and deletes the file of the transmitted margin amount. In step S227, the information processing apparatus 214 transmits an end command to the printing apparatus 100.

In step S228, the information processing apparatus 214 determines whether the current transmission page number is the number of the final page of the current printing job. If YES in step S228, the process advances to step S230; if NO, the process advances to step S229. In step S229, the transmission page number is incremented by one, and the process returns to step S225.

In step S230, the information processing apparatus 214 transmits a start command to the printing apparatus 100. Since the current page is the final page, there is no margin information to be transmitted, and only the start command is transmitted. Note that an arrangement in which the rear-edge-side margin amount BS12 of printing data of the final page is analyzed and transmitted as margin information can also be employed. This margin information is not used for the setting of the overlap amount SC, and can be used to convey the printing sheet 1 while skipping printing of the printing sheet 1 in the margin region on the rear edge side.

In step S231, the information processing apparatus 214 transmits the printing data of the final page to the printing apparatus 100, and deletes the file of the transmitted printing data. In step S232, the information processing apparatus 214 transmits an end command to the printing apparatus 100, thereby terminating the processing of one unit.

By the above-described processing, the printing apparatus 100 can obtain the rear-edge-side margin amount BS12 of the current page and the leading-edge-side margin amount BS11 of the next page upon receiving a start command. Therefore, the printing apparatus 100 need not store printing data, and can set the overlap amount SC without receiving printing data of the next page. The printing apparatus 100 can quickly and stably execute successive overlapped conveyance control of the printing sheets 1.

As roughly described above, the margin amounts BS11 and BS12 are variable amounts determined by the contents of printing data. When the rear-edge-side margin amount BSB of the preceding sheet 1-A and the leading-edge-side margin amount BSF of the succeeding sheet 1-B are large, the overlap amount SC can be logically increased, and significant shortening of the conveyance time is expected. If there is no margin information, the printing apparatus 100 needs to analyze printing data and calculate the margin amount. For this reason, a case in which the setting of the overlap amount SC is delayed may occur depending on a condition which prolongs the margin amount analysis processing time, for example, the data format of printing data. In this case, even if the overlap amount SC can be logically increased and significant shortening of the conveyance time is expected, this cannot be implemented.

Especially when the storage capacity of the RAM 203 is restricted and no sufficient printing data spool buffer can be ensured, calculation of the margin amount BS12 in the printing apparatus 100 is disadvantageous. Since there is a limit on analysis of the margin amount BS12 of the next page, which proceeds parallel to printing processing of the current page, it becomes difficult to implement ideal overlapping control.

As in this embodiment, the information processing apparatus 214 notifies the printing apparatus 100 of, as preliminary information, the margin amounts of the current and next pages necessary for successive overlapped conveyance control. The overlap amount SC can be set more reliably at the necessary timing for successive overlapped conveyance control.

<Sequential Printing Mode>

Figure 16A:
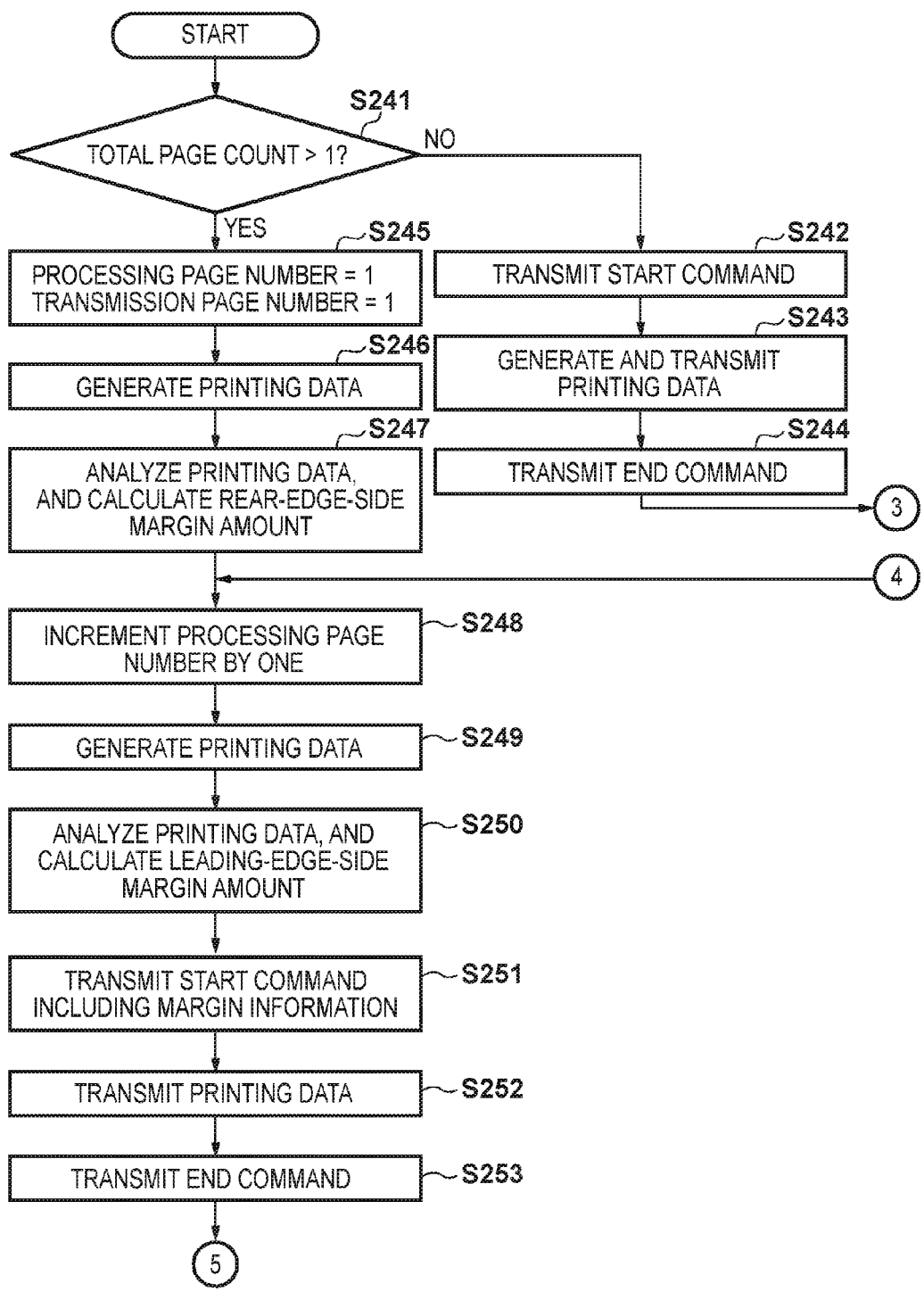
FIGS. 16A and 16B are flowcharts illustrating an example of processing executed by the information processing apparatus according to the embodiment of the present invention.
Figure 16B:
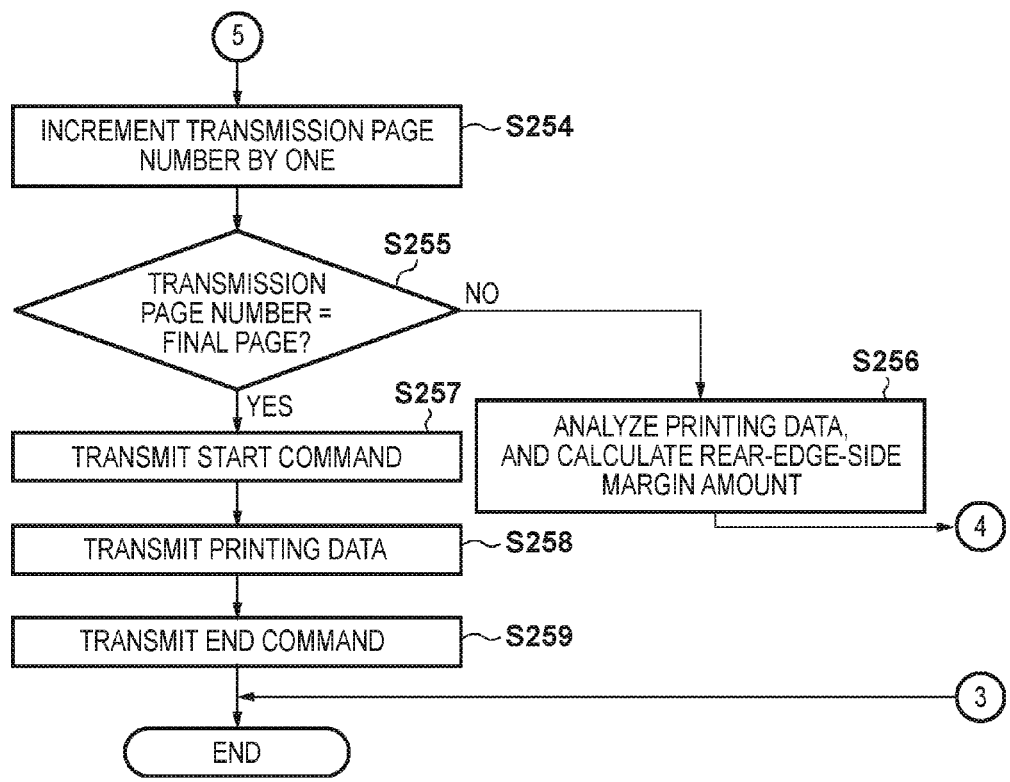

An example of printing processing in the sequential printing mode in step S205 will be explained with reference to FIGS. 16A and 16B. In the sequential printing mode, generation and transmission of printing data are repeated for each page. However, to notify in advance the printing apparatus 100 of margin information, printing data of the (n+1)th page is generated before transmitting printing data of the nth page.

First, the information processing apparatus 214 determines whether a printing job is a job to print on the printing sheets 1 of a plurality of pages (step S241). If YES in step S241, the process advances to step S242; if NO, the process advances to step S245.

Steps S242 to S244 are printing processing on the printing sheet 1 of one page, and are processing when successive overlapped conveyance of the printing sheets 1 is unnecessary. In step S242, the information processing apparatus 214 transmits a start command to the printing apparatus 100. In step S243, the information processing apparatus 214 repeats, for one page, processing of transmitting printing data to the printing apparatus 100 while generating printing data for a predetermined unit. In step S244, the information processing apparatus 214 transmits an end command to the printing apparatus 100, thereby terminating the processing of one unit.

In step S245, the information processing apparatus 214 sets "1" in each of the processing page number and transmission page number, generates printing data corresponding to the page (first page) of the current processing page number, and saves it as a file (step S246). In step S247, the information processing apparatus 214 analyzes the printing data generated in step S246, and calculates the margin amount BS12 positioned on the rear edge side of the printing sheet 1. That is, the rear-edge-side margin amount BS12 of printing data to be printed on the printing sheet 1 of the first page is calculated. Although the calculation result may be saved as a file in the hard disk or the like in association with the processing page number, it may be managed in a volatile memory because its size is small and the calculation result is transmitted soon. This also applies to the margin amounts BS11 and BS12.

In step S248, the information processing apparatus 214 increments the processing page number by one. In step S249, the information processing apparatus 214 generates printing data corresponding to the page of the current processing page number and saves it as a file. In step S250, the information processing apparatus 214 analyzes the printing data generated in step S249, and calculates the margin amount BS11 positioned on the leading edge side of the printing sheet 1.

In step S251, the information processing apparatus 214 transmits the margin information to the printing apparatus 100 together with a start command (the margin information is information based on margin amount analysis results in steps S247 and S250 (and step S256 to be described later)). In this embodiment, the margin information includes the rear-edge-side margin amount BS12 of printing data corresponding to the page of the current transmission page number, and the leading-edge-side margin amount BS11 of the printing data corresponding to a page (page of the current processing page number) next to the current transmission page number. That is, the margin amount BS11 of printing data of the (n+1)th page is transmitted prior to transmission of the printing data of the (n+1)th page.

In step S252, the information processing apparatus 214 transmits printing data corresponding to the page of the current transmission page number to the printing apparatus 100, and deletes the file of the transmitted printing data. In step S253, the information processing apparatus 214 transmits an end command to the printing apparatus 100.

In step S254, the information processing apparatus 214 increments the transmission page number by one. In step S255, the information processing apparatus 214 determines whether the current transmission page number is the number of the final page of the current printing job. If the current transmission page number indicates the final page of the printing job, the process advances to step S257; otherwise, the process advances to step S256. In step S256, the information processing apparatus 214 analyzes the printing data of the current processing page number, and calculates the rear-edge-side margin amount BS12. Then, the process returns to step S248 to repeat the same processing.

In step S257, the information processing apparatus 214 transmits a start command to the printing apparatus 100. Since the current page is the final page, there is no margin information to be transmitted, and only the start command is transmitted. Note that an arrangement in which the rear-edge-side margin amount BS12 of printing data of the final page is analyzed and transmitted as margin information can also be employed. The reason is the same as that described above.

In step S257, the information processing apparatus 214 transmits the printing data of the final page to the printing apparatus 100, and deletes the file of the transmitted printing data. In step S258, the information processing apparatus 214 transmits an end command to the printing apparatus 100, thereby terminating the processing of one unit.

By the above-described processing, the printing apparatus 100 can obtain the rear-edge-side margin amount BS12 of the current page and the leading-edge-side margin amount BS11 of the next page upon receiving a start command. Hence, the printing apparatus 100 need not store printing data, and can set the overlap amount SC without receiving printing data of the next page. The printing apparatus 100 can quickly and stably execute successive overlapped conveyance control of the printing sheets 1.

In this embodiment, the information processing apparatus 214 is configured to transmit margin information to the printing apparatus 100 together with a start command. However, the margin information transmission timing is not limited to this, and the margin amount BS12 of the current page and the margin amount BS11 of the next page may also be transmitted separately. If the leading-edge-side margin amount BS11 of the next page can be transmitted to the printing apparatus 100 by the end of printing the last row of the current page in the printing apparatus 100, the setting of the overlap amount SC is highly likely to be ready in time. Thus, the leading-edge-side margin amount BS11 of the next page may be transmitted during transmission of printing data of the current page.

To simplify data communication control, transmission of the leading-edge-side margin amount BS11 of the next page can be performed prior to transmission of printing data of the current page. It is advantageous to transmit the leading-edge-side margin amount BS11 of the next page together with a start command, as in this embodiment.

In the all-page spool mode, analysis of printing data of all pages is completed before transmitting printing data of the first page. Therefore, all pieces of margin information may be transmitted at once together with or before a start command for the first page. However, in terms of allocation of the margin information storage area in the printing apparatus 100, it is advantageous to individually transmit margin information for each page together with a start command.

The processes in the all-page spool mode and the sequential printing mode are processing sequences capable of increasing the printing speed when successive overlapped conveyance control is possible. If each of these sequences is executed even in a case in which successive overlapped conveyance control is impossible, the productivity of the printing apparatus 100 may drop. This is because the leading-edge-side margin amount BS11 of the next page is calculated in this processing, and a time lag is generated until printing starts after a printing job instruction.

To prevent this, the information processing apparatus 214 may determine whether the printing apparatus can execute successive overlapped conveyance. If the printing apparatus can execute successive overlapped conveyance, the information processing apparatus 214 may execute processing in the all-page spool mode or the sequential printing mode, and if the printing apparatus cannot execute successive overlapped conveyance, may perform normal processing. In normal processing, the information processing apparatus 214 neither analyzes the margin amounts BS11 and BS12, nor transmits margin information to the printing apparatus 100. In normal processing, generation and transmission of printing data can be performed for each page. In this case, for example, printing data of the nth page is transmitted without waiting for generation of printing data of the (n+1)th page.

Whether successive overlapped conveyance can be executed can be determined based on specification information of the printing apparatus 100. For example, the information processing apparatus 214 can acquire the specification information from the printing apparatus 100, and determine whether successive overlapped conveyance can be executed. Alternatively, whether successive overlapped conveyance can be executed can be determined based on printing conditions designated by the user. Detailed determination elements are, for example, the paper type, single-sided/double-sided setting, color/monochrome setting, printing quality, and frame setting. As the paper type, the hardness (nerve) of paper and the like can be considered. As for the single-sided/double-sided setting, it can be determined not to execute successive overlapped conveyance for the double-sided setting. As for the color/monochrome setting, printing quality, and frame setting, it can be determined not to execute successive overlapped conveyance for the color setting, high printing quality, and the frameless setting.

<Example of Processing of Printing Apparatus>

Figure 17:
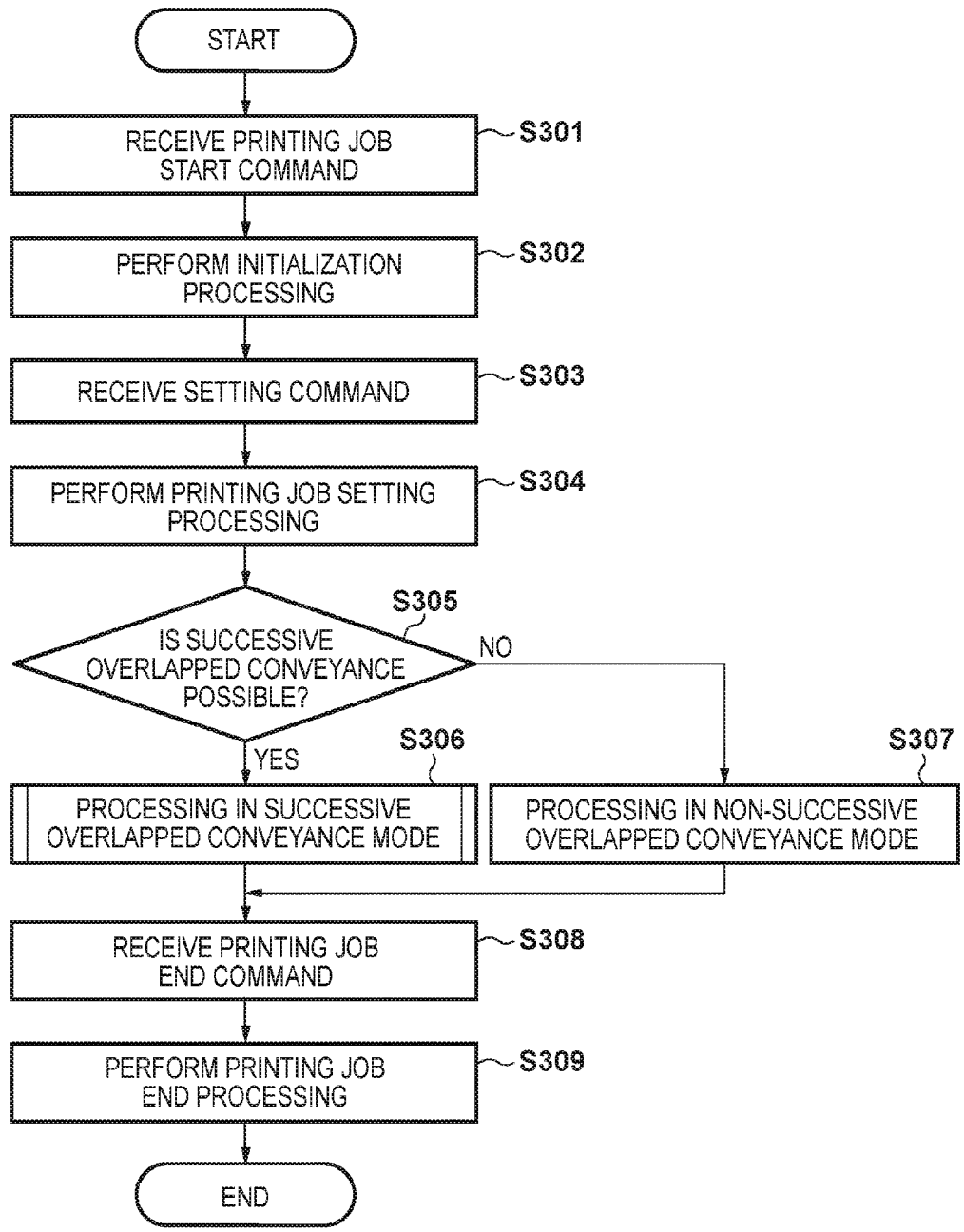
FIG. 17 is a flowchart illustrating an example of processing executed by the control unit of the printing apparatus in FIG. 1.

An example of processing of the control unit of the printing apparatus 100 coping with a pre-notification of the margin amount will be explained with reference to FIG. 17.

First, the printing apparatus 100 receives a printing job start command transmitted from the information processing apparatus 214 (step S301), and executes initialization processing of a printing job (step S302). The printing apparatus 100 receives a setting command (step S303), and executes setting processing of the printing job based on printing conditions designated by the user (step S304).

Then, the printing apparatus 100 determines whether successive overlapped conveyance is possible for the current printing job (step S305). As described above, the information processing apparatus 214 determines whether successive overlapped conveyance is possible, and the printing apparatus 100 can comply with the determination. For example, the information processing apparatus 214 can notify the printing apparatus 100 of successive overlapped conveyance possible/impossible information by a command in step S301 or S303, and the printing apparatus 100 can make determination based on this information. Alternatively, based on printing setting information included in the command in step S303, the printing apparatus 100 may determine whether successive overlapped conveyance is possible.

If the printing apparatus 100 determines in step S305 that successive overlapped conveyance is possible (YES), it executes processing in the successive overlapped conveyance mode (step S306). Details will be described later. If the printing apparatus 100 determines in step S305 that successive overlapped conveyance is impossible (NO), it executes processing in the non-successive overlapped conveyance mode (step S307). A processing sequence to be executed in step S307 may be the same as a general processing sequence in which no successive overlapped conveyance is performed. After that, the printing apparatus 100 executes printing job end processing (step S309) in response to reception of a printing job end command (step S308).

An example of processing in the successive overlapped conveyance mode in step S306 will be explained with reference to FIGS. 18A and 18B. First, the printing apparatus 100 receives a start command (step S311). Since the start command includes margin information, the printing apparatus 100 decides the overlap amount of the current page and next page based on margin information in step S312 (step S312). When the start command does not include margin information, it is also possible to stop successive overlapped conveyance control and execute general printing processing.

The printing apparatus 100 determines whether the current page is the first page in step S313. If YES, the printing sheet 1 has not been fed yet and is thus fed (step S314). In this embodiment, a start command for the first page does not include the leading-edge-side margin amount BS11 of the first page. Therefore, the leading-edge-side margin amount BS11 is finalized by the processing in steps S315 to S317. Note that the information processing apparatus 214 can calculate the leading-edge-side margin amount BS11 of the first page, and set it in margin information of the start command for the first page.

While receiving printing data for a predetermined unit from the information processing apparatus 214 (step S315), the printing apparatus 100 analyzes the printing data (step S316). The printing apparatus 100 repeats these processes until the margin amount BS11 is finalized (step S317). The printing apparatus 100 conveys the printing sheet 1 by the finalized margin amount BS11 (step S318). Note that the printing data reception unit in step S315 can be freely decided in consideration of the reception memory size of the printing apparatus 100 or the like.

If NO in step S313, that is, if the current page is the second or subsequent page, the printing sheet 1 of the second page has already been fed by successive overlapped conveyance control, and the printing apparatus 100 discards data of the margin region on the leading edge side of the printing data (step S319). This discard processing changes depending on the data format of printing data. For example, as for a fixed-length data format such as RAW data, the size of data which should be discarded is decided from the margin amount of the leading edge. As for a variable-length data format such as JPEG data, it may be necessary to decode data.

Then, the printing apparatus 100 initializes the run length of the margin region included in the printing data to be 0 (step S320). The run length of the margin region is a value representing the number of rasters in which all pixels are white, out of printing data, and is different from the above-described margin amounts BS11 and BS12. Since no ink need be discharged to a region where rasters of all white pixels continue, the printing speed can be increased by conveying the printing sheet 1.

While receiving printing data for a predetermined unit from the information processing apparatus 214 (step S321), the printing apparatus 100 analyzes the printing data (step S322). If a margin region is detected in step S323, the printing apparatus 100 adds the length of the detected margin region to the run length of the margin region (step S324).

If the printing data is not the margin region in step S323, the process advances to step S325, and the printing apparatus 100 conveys the printing sheet 1 by the number of rasters corresponding to the run length of the margin region (step S325), and returns the run length of the margin region to 0 (step S326). The printing apparatus 100 converts printing data for a non-margin region into control data of the printhead 7, and executes a printing operation (step S327).

In step S328, the printing apparatus 100 determines whether a predetermined condition has been established. The establishment of the predetermined condition is "printing data of one page has been processed" or "the processing raster range has reached the margin region of the rear edge". In either case, the process advances to processes in step S329 and subsequent steps in order to complete printing processing of the current page and shift to the next page. If NO in step S328, the process returns to step S321 in order to continue processing of the current page.

At the stage of step S329, the printing processing has been completed immediately before the rear-edge-side margin region (region of the margin amount BS12) of the printing data. At this time, if the margin amount BS12 is 0, all printing data transmitted from the information processing apparatus 214 have been processed. If the margin amount BS12 is nonzero, this means reception of data for a margin where printing is unnecessary, so the printing apparatus 100 executes discard processing so as to complete the reception of printing data (step S330).

Thereafter, the printing apparatus 100 determines whether the current page is the final page (step S331). In this determination, for example, if the start command received in step S311 does not include information of the leading-edge-side margin amount BS11 of the next page, it may be determined that the current page is the final page. Alternatively, information representing whether the next page exists in the start command may be added.

If the printing apparatus 100 determines that the current page is the final page (YES), it discharges only the current page because there is no next page (step S332). If the printing apparatus 100 determines that the current page is not the final page (NO), it makes the printing sheets 1 of the current page and next page overlap each other based on the overlap amount set in step S312, and conveys them (step S333).

In step S334, the information processing apparatus 214 receives an end command. If the current page is the final page in step S335, the process ends. If the current page is not the final page, the process returns to step S311.

As described above, an overlap amount necessary for successive overlapped conveyance control can be calculated using margin information notified from the information processing apparatus 214 together with a start command, without analyzing printing data. Hence, the overlap amount can be stably finalized at a necessary timing.

<Example of Sequence between Apparatuses>

Figure 19:
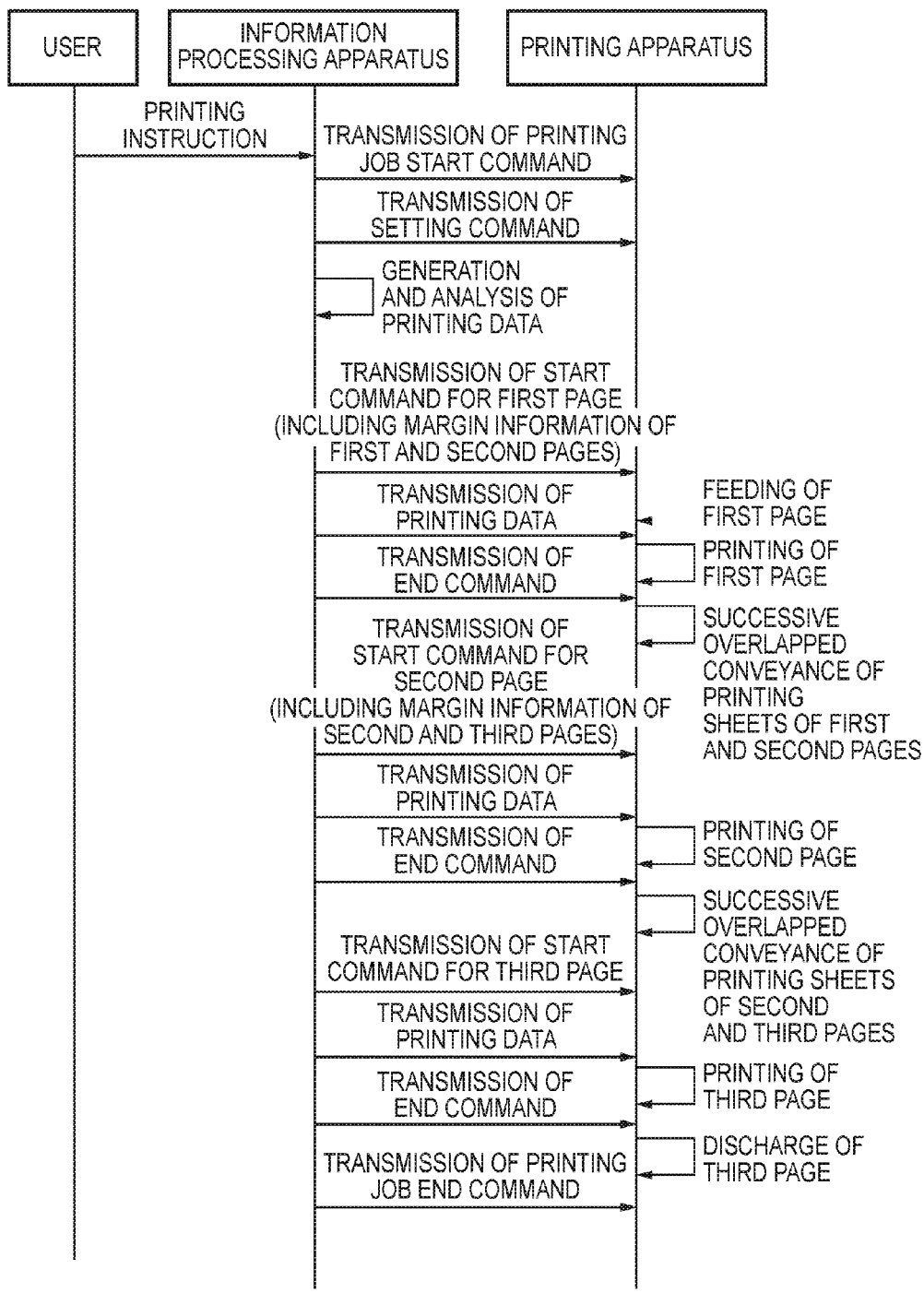
FIG. 19 is a chart illustrating an example of processing between the information processing apparatus and the printing apparatus.
Figure 20:
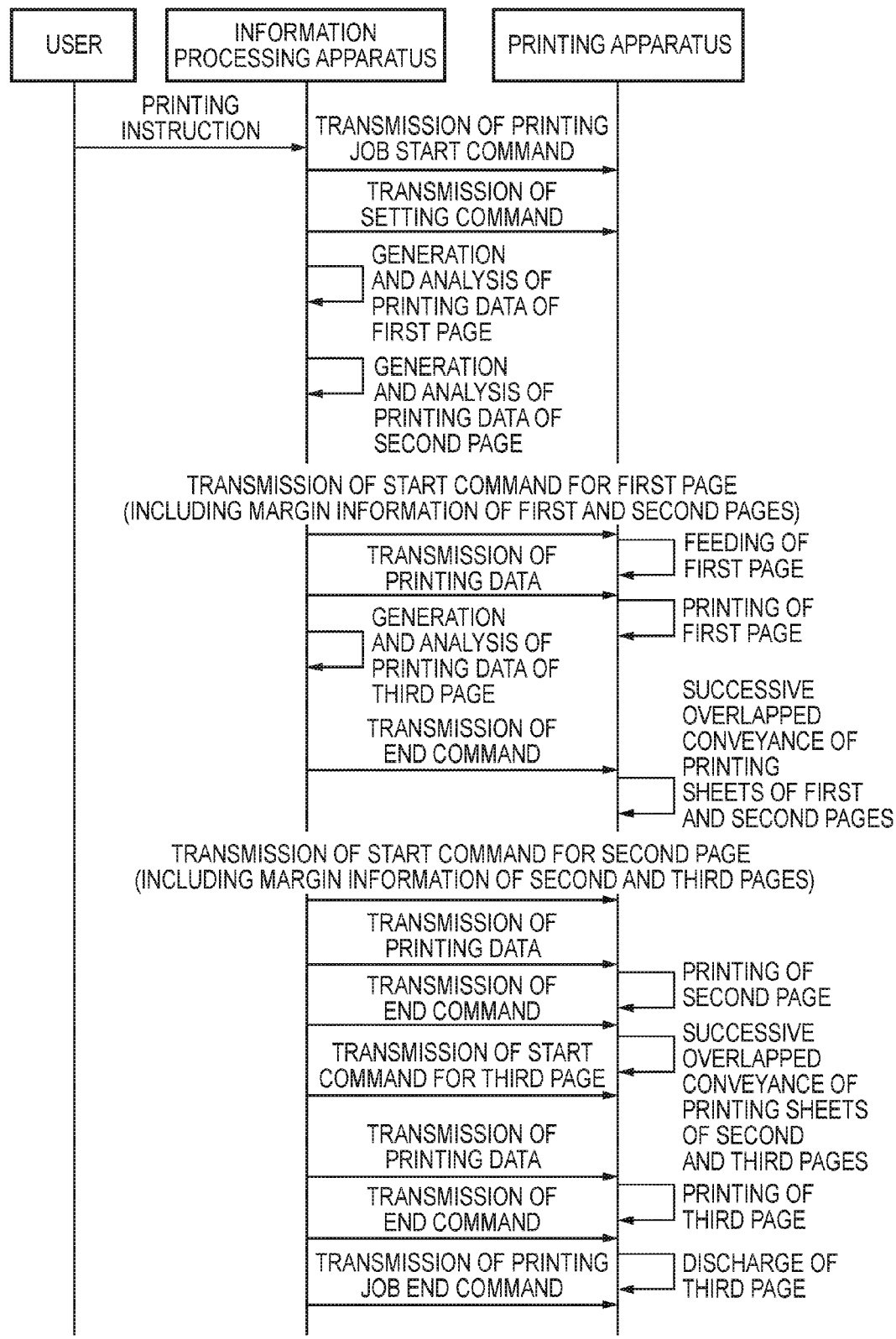
FIG. 20 is a chart illustrating an example of processing between the information processing apparatus and the printing apparatus.

An example of a processing sequence when performing successive overlapped conveyance control between the information processing apparatus 214 and the printing apparatus 100 will be explained with reference to FIGS. 19 and 20. A case in which printing is performed on three printing sheets 1 will be assumed here. FIG. 19 shows a case in which the information processing apparatus 214 executes processing in the all-page spool mode. FIG. 20 shows a case in which the information processing apparatus 214 executes processing in the sequential printing mode.

First, the case in the all-page spool mode will be explained with reference to FIG. 19. When the user issues a printing instruction, the information processing apparatus 214 performs transmission of a printing job start command and transmission of a setting command. Also, the information processing apparatus 214 performs generation of printing data of all pages and analysis for margin information.

Then, the information processing apparatus 214 transmits a start command and margin information for the first page to the printing apparatus 100. This margin information includes information of the rear-edge-side margin amount BS12 of printing data of the first page and the leading-edge-side margin amount BS11 of printing data of the second page. The printing apparatus 100 sets the overlap amount SC, and starts feeding of the printing sheet 1 of the first page.

The information processing apparatus 214 transmits printing data of the first page and an end command for the first page to the printing apparatus 100. The printing apparatus 100 performs printing on the printing sheet 1 of the first page based on the received printing data, and performs successive overlapped conveyance of the printing sheet 1 of the first page and the printing sheet 1 of the second page.

The information processing apparatus 214 transmits a start command and margin information for the second page to the printing apparatus 100. This margin information includes information of the rear-edge-side margin amount BS12 of printing data of the second page and the leading-edge-side margin amount BS11 of the printing data of the third page. The printing apparatus 100 sets the overlap amount SC.

The information processing apparatus 214 transmits printing data of the second page and an end command for the second page to the printing apparatus 100. The printing apparatus 100 performs printing on the printing sheet 1 of the second page based on the received printing data, and performs successive overlapped conveyance of the printing sheet 1 of the second page and the printing sheet 1 of the third page.

The information processing apparatus 214 transmits a start command for the third page to the printing apparatus 100. Since there is no margin information, no margin information is transmitted. However, in order to skip printing, the rear-edge-side margin amount BS12 of the third page may also be transmitted, as described above.

The information processing apparatus 214 transmits printing data of the third page, an end command for the third page, and an end command for the printing job to the printing apparatus 100. The printing apparatus 100 performs printing on the printing sheet 1 of the third page based on the received printing data, and discharges the printing sheet 1 of the third page, thereby terminating the processing for one unit.

Next, the case in the sequential printing mode will be explained with reference to FIG. 20. When the user issues a printing instruction, the information processing apparatus 214 transmits a printing job start command and a setting command. The information processing apparatus 214 performs generation of printing data of the first page and analysis for margin information. In addition, the information processing apparatus 214 performs generation of printing data of the second page and analysis for margin information.

Then, the information processing apparatus 214 transmits a start command and margin information for the first page to the printing apparatus 100. This margin information includes information of the rear-edge-side margin amount BS12 of printing data of the first page and the leading-edge-side margin amount BS11 of printing data of the second page. The printing apparatus 100 sets the overlap amount SC, and starts feeding of the printing sheet 1 of the first page.

The information processing apparatus 214 transmits printing data of the first page. Also, the information processing apparatus 214 performs generation of printing data of the third page and analysis for margin information, and transmits an end command. The printing apparatus 100 performs printing on the printing sheet 1 of the first page based on the received printing data, and performs successive overlapped conveyance of the printing sheet 1 of the first page and the printing sheet 1 of the second page.

The information processing apparatus 214 transmits a start command and margin information for the second page to the printing apparatus 100. This margin information includes information of the rear-edge-side margin amount BS12 of printing data of the second page and the leading-edge-side margin amount BS11 of printing data of the third page. The printing apparatus 100 sets the overlap amount SC.

The information processing apparatus 214 transmits printing data of the second page and an end command. The printing apparatus 100 performs printing on the printing sheet 1 of the second page based on the received printing data, and performs successive overlapped conveyance of the printing sheet 1 of the second page and the printing sheet 1 of the third page.

The information processing apparatus 214 transmits a start command for the third page to the printing apparatus 100. Since there is no margin information, no margin information is transmitted. However, in order to skip printing, the rear-edge-side margin amount BS12 of the third page may also be transmitted, as described above.

The information processing apparatus 214 transmits printing data of the third page, an end command for the third page, and an end command for the printing job to the printing apparatus 100. The printing apparatus 100 performs printing on the printing sheet 1 of the third page based on the received printing data, and discharges the printing sheet 1 of the third page, thereby terminating the processing for one unit.

<Effect of Pre-notification of Margin Amount>

An increase in printing speed by the pre-notification of the margin amount will be explained with reference to FIGS. 21A and 21B by citing comparison examples.

The following case is assumed here. First, assume that the printing data generation time in the information processing apparatus 214 is 1 sec/page on average. Also, assume that the printing apparatus 100 can print 20 pages/min (3 sec/page) when no successive overlapped conveyance is performed, and can print 21 pages/min when successive overlapped conveyance is performed. A case in which a document of 21 pages is printed is assumed.

A case in which the all-page spool mode has been selected will be explained first with reference to FIG. 21A. An example assumes the information processing apparatus 214 and the printing apparatus 100. Comparative Example 1 assumes an arrangement in which no successive overlapped conveyance is performed. Comparative Example 2 assumes a case in which successive overlapped conveyance is performed, but the margin amount is calculated on the printing apparatus side and the overlap amount SC is set.

In this mode, the information processing apparatus 214 generates printing data of 21 pages. This step takes about 21 sec. Assume that the processing time taken for this step is the same between the example and the comparative example. After generating printing data of all pages, the printing data are transferred to the printing apparatus and printed.

In Comparative Example 1 in which no successive overlapped conveyance is performed, the printing time per page is assumed to be 3 sec. Then, the total printing time becomes 63 sec, and the total time including the processing time of the information processing apparatus 214 becomes 84 sec.

In Comparative Example 2 in which successive overlapped conveyance is performed, the setting of the overlap amount SC may be delayed, and the speed performance of the printing apparatus 100 may not be fully exerted. The printing time becomes 81 sec in the best case and 84 sec in the worst case.

When the processing in this example is used, the information processing apparatus 214 notifies in advance the printing apparatus 100 of margin information. As the printing time, the best case in Comparative Example 2 can be obtained stably. Thus, the total time becomes 81 sec.

As described above, in this embodiment or this example, the information processing apparatus 214 analyzes a margin amount, and the analysis processing hardly influences the printing time. For example, when printing target data output from an application is PDL data such as PDF data or XPS data, analysis processing of the PDL data is executed inside the information processing apparatus 214. Even the margin amount is calculated in the analysis processing of the PDL data, and the time taken for analysis processing of the margin amount is not generated. To the contrary, when raster data generated by the system renderer of the OS is converted into image data such as JPEG data, and the image data is transmitted to the printing apparatus 100, a white region needs to be analyzed inside the information processing apparatus 214, and the time taken for analysis processing is generated. However, the time taken for the analysis processing of the white region is short in consideration of the hardware specifications of the information processing apparatus, so the influence on the printing time is little.

Next, a case in which the sequential printing mode has been selected will be explained with reference to FIG. 21B. Comparative Example 11 assumes an arrangement in which no successive overlapped conveyance is performed. Comparative Example 12 assumes a case in which successive overlapped conveyance is performed, but the margin amount is calculated on the printing apparatus side to set the overlap amount SC.

In all of Comparative Example 11, Comparative Example 12, and this example, generation and transmission of printing data are performed for each page. However, in this example, generation of printing data of the second page is performed before transmitting printing data of the first page. This takes 2 sec. In contrast, in the comparative examples, after generating printing data of the first page, transfer of the printing data becomes possible. In this example, the time taken till the start of data transfer becomes longer by 1 sec than that in the comparative examples.

However, successive overlapped conveyance control can be stably performed in a subsequent printing operation, and a printing time of 60 sec can be stably obtained. Note that the total printing time is 64 sec in Comparative Example 11 and 62 sec in this example. In Comparative Example 12, the total printing time is 61 sec in the best case and 64 sec in the worst case. Although the printing time in the best case of Comparative Example 12 is shorter than that in this embodiment, this example is superior in terms of the stability of the printing time.

Second Embodiment

By the pre-notification of the margin amount, printing data can be clipped in an information processing apparatus 214 and transmitted to a printing apparatus 100. This can shorten the processing time in the printing apparatus 100, further increasing the printing speed.

For example, in printing data PD shown in FIG. 10, margin regions of margin amounts BS11 and BS12 exist on the leading edge side and rear edge side, respectively. These margin regions are regions where no printing is performed on a printing sheet 1 (no ink is discharged), and need not be transmitted to the printing apparatus 100. It suffices to transmit only printing data of a region IG including an image.

The information processing apparatus 214 analyzes printing data to calculate the margin amounts BS11 and BS12, and then generates printing data excluding the margin regions. This clipping processing is executed next to processing in step S223 in the processing example of FIG. 15A, and executed next to processing in step S256 in the processing example of FIG. 16B.

When performing clipping processing even for the first page, it is only necessary to calculate the leading-edge-side margin amount BS11 even for the first page, and perform clipping processing in accordance with the result.

The printing apparatus 100 suffices to perform printing position adjustment of the received printing data after clipping (control of a conveyance amount corresponding to the margin of the printing sheet 1) based on the margin information notified in advance.

Figure 22A:
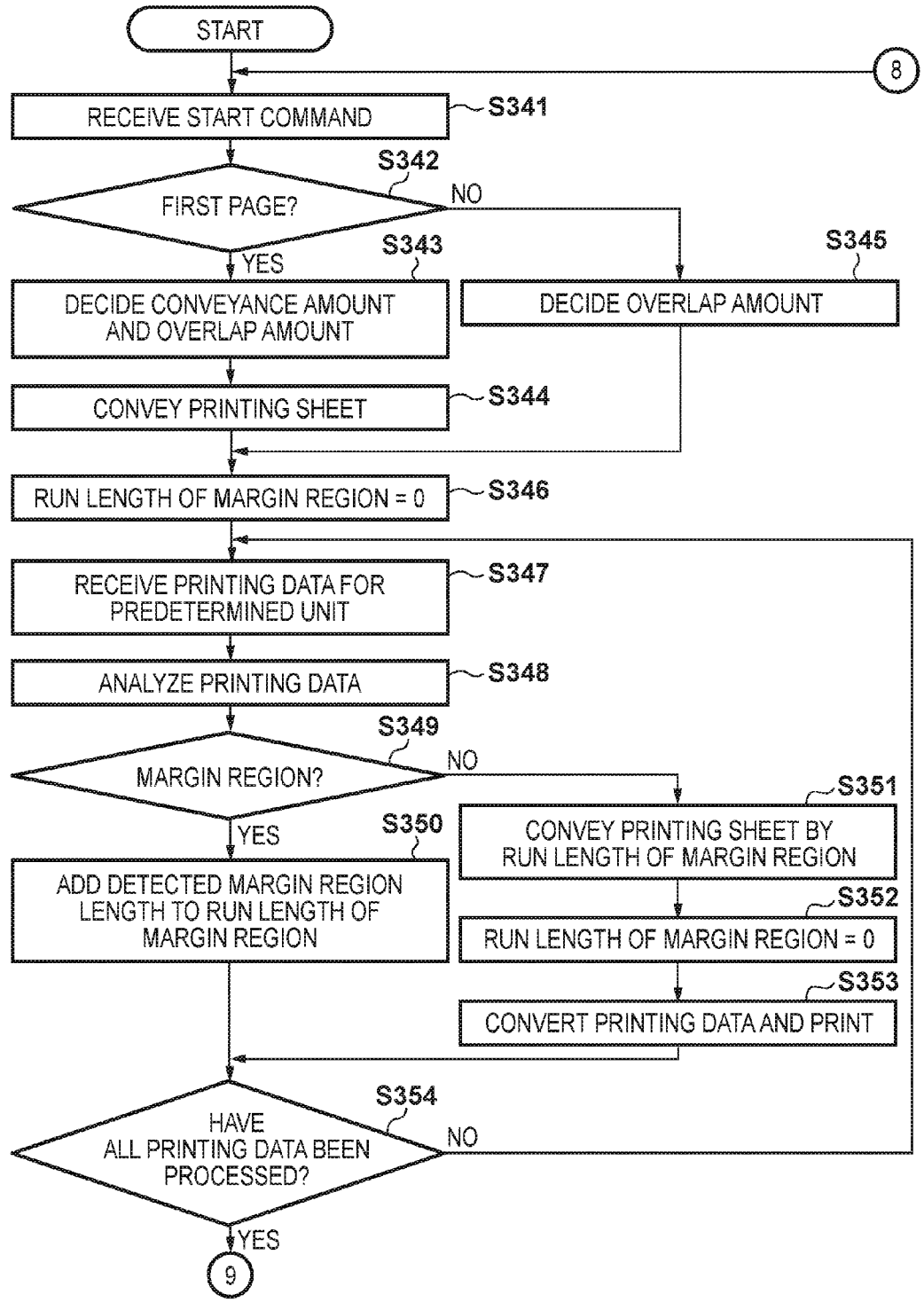
FIGS. 22A and 22B are flowcharts illustrating an example of processing executed by the control unit of the printing apparatus shown in FIG. 1.
Figure 22B:
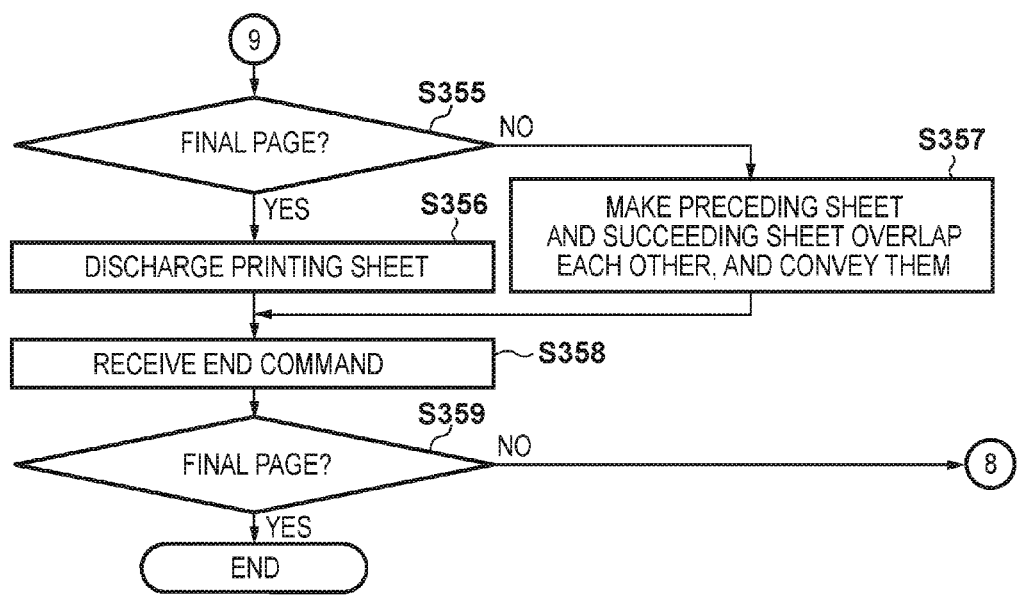

FIGS. 22A and 22B show an example of processing by the control unit of the printing apparatus 100, and especially are flowcharts showing an example of processing when the information processing apparatus 214 clips printing data. The processing example of FIGS. 22A and 22B is an alternative example of the processing example of FIGS. 18A and 18B.

Note that the clipping target is assumed to be all pages. Thus, the information processing apparatus 214 is assumed to calculate the leading-edge-side margin amounts BS11 and the rear-edge-side margin amounts BS12 for all pages excluding the final page. Margin information included in a start command for the first page represents the leading-edge-side margin amount BS11 and rear-edge-side margin amount BS12 of printing data of the first page, and the leading-edge-side margin amount BS11 of printing data of the second page. Margin information is unnecessary for a start command for the final page. Start commands for the remaining pages are the same as those in the first embodiment.

The printing apparatus 100 receives a start command (step S341), and determines in step S342 whether the current page is the first page. If the current page is the first page (YES), the process advances to step S343, and the printing apparatus 100 decides a conveyance amount at the time of feeding the first page, based on the leading-edge-side margin amount BS11 of the first page included in the start command. More specifically, the conveyance amount is set so that the printing sheet 1 is conveyed to locate the region IG in the example of FIG. 10 at a printing start position by a printhead 7 at the time of feeding. The printing apparatus 100 decides an overlap amount SC of the current page and next page based on the rear-edge-side margin amount BS12 of the first page and the leading-edge-side margin amount BS11 of the next page that are included in the start command. In step S344, the printing apparatus 100 conveys the printing sheet 1 of the first page in accordance with the conveyance amount set in step S343.

If NO in step S342, the printing apparatus 100 decides the overlap amount SC of the current page and next page based on the rear-edge-side margin amount BS12 of the current page and the leading-edge-side margin amount BS11 of the next page that are included in the start command (step S345).

Figure 18A:
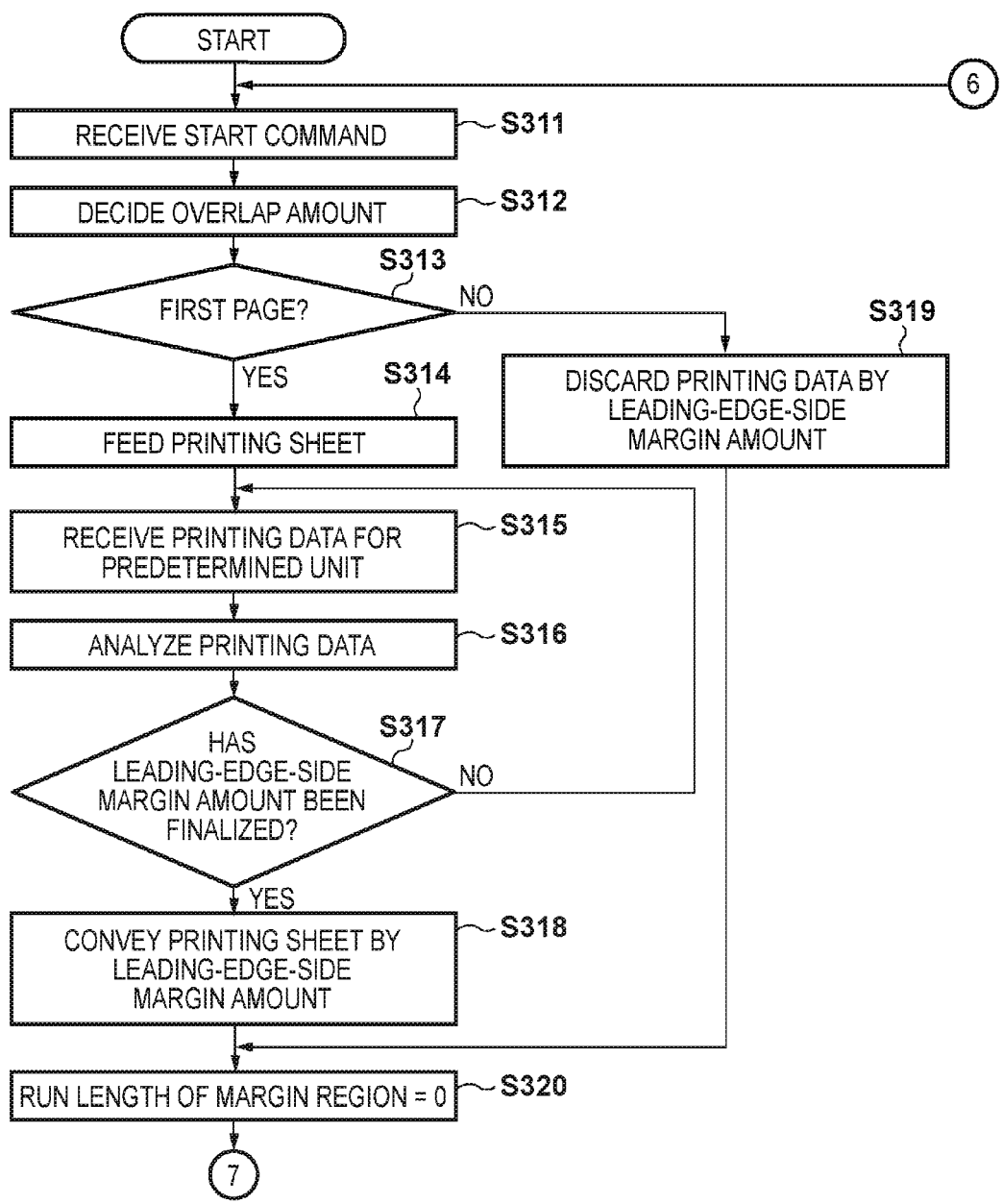
FIGS. 18A and 18B are flowcharts illustrating an example of processing executed by the control unit of the printing apparatus shown in FIG. 1.
Figure 18B:
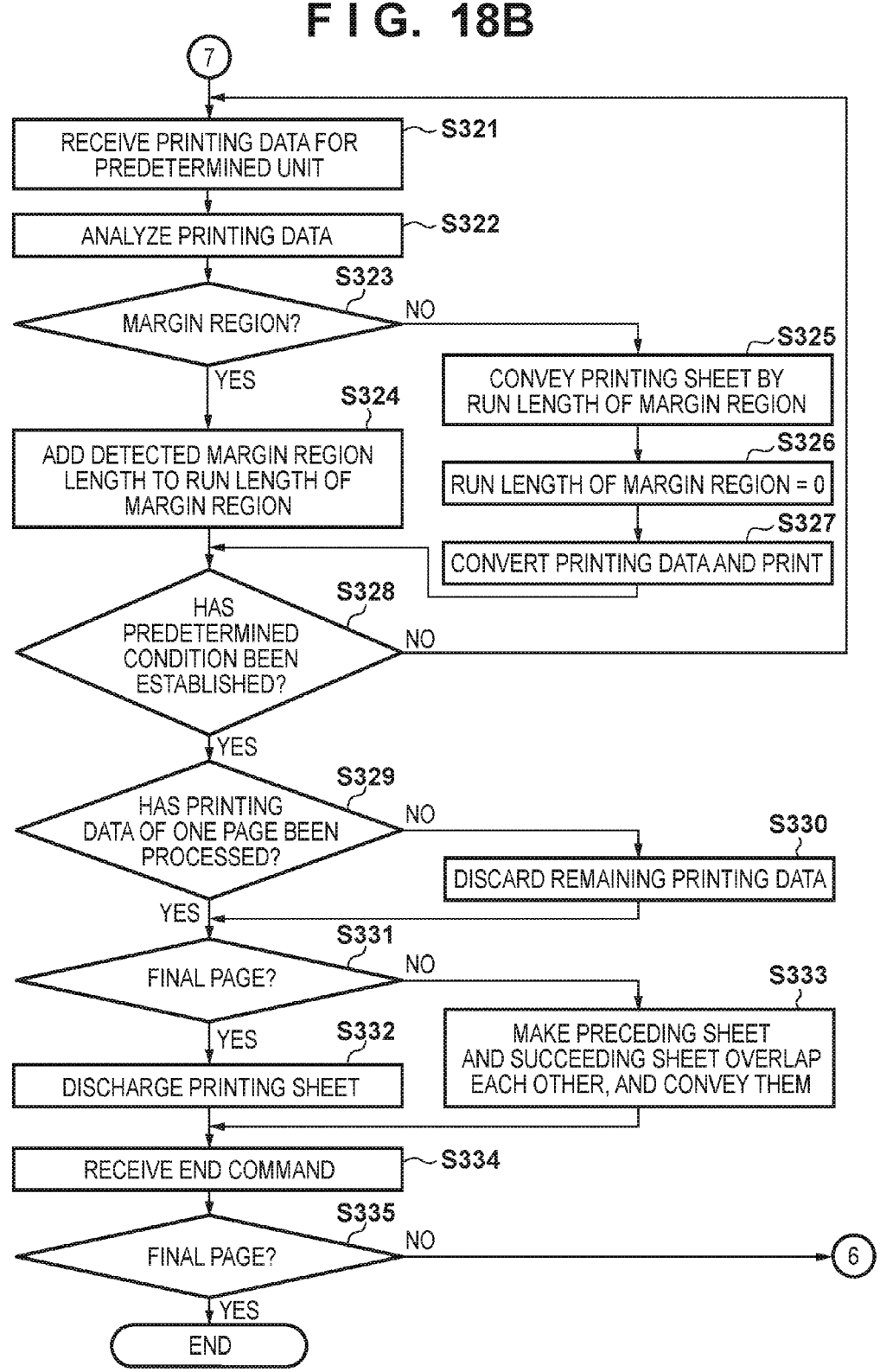

Note that processes in steps S346 to S353 are the same as those in steps S320 to S327 of FIGS. 18A and 18B, and a detailed description thereof will not be repeated.

In step S354, the printing apparatus 100 determines whether the entire printing data of one page has been processed. If the entire printing data of one page has been processed, the process advances to step S355. If the entire printing data of one page has not been processed, the process returns to step S347 to continue the processing of the current page.

Note that processes in steps S355 to S359 are the same as those in steps S331 to S335 of FIGS. 18A and 18B, and a detailed description thereof will not be repeated. A difference from the first embodiment is that all printing data have already been processed because at the stage of step S355 in the second embodiment, the information processing apparatus 214 transmits printing data in which the margin regions on the leading edge side and the rear edge side are clipped.

In step S358, the printing apparatus 100 receives an end command from the information processing apparatus 214. If the current page is the final page in step S359, the process is terminated. If the current page is not the final page, the process returns to step S341.

As described above, according to the second embodiment, the information processing apparatus 214 can clip printing data by using the analysis result of the margin amount of each page. The printing apparatus 100 can perform printing alignment of the printing data by using the margin information. The data transfer amount between the information processing apparatus 214 and the printing apparatus 100 and the processing amount of the printing apparatus 100 can therefore be reduced, further increasing the printing speed.

A concrete example of how much the printing speed of the printing apparatus 100 is increased by clipping will be described. For example, the following case is assumed. Assume that the printing apparatus 100 can print 20 pages/min (3 sec/page) when no successive overlapped conveyance is performed, and can print 21 pages/min when successive overlapped conveyance is performed. The breakdown of the printing time is 2.6 sec for printing processing and about 0.25 sec for feeding and discharge when the entire page is printed without clipping at the time of successive overlapped conveyance. Then, a case in which a document of 21 pages is printed and all pages are printed by clipping is assumed.

At this time, if printing data is reduced by 10% for each page by clipping, the time of printing processing of each page is shortened from 2.6 sec to 2.34 sec. As a result, the printing time of the printing apparatus 100 when printing 21 pages can be shortened from 60 sec to about 54.4 sec.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

In this specification, the subject of each processing in the flowchart of processing on the information processing apparatus side is described as the information processing apparatus. However, the subject may be replaced with a printer driver or a printing application.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefits of Japanese Patent Application No. 2014-116201, filed Jun. 4, 2014, which is hereby incorporated by reference herein in its entirety.

What is claimed is:

1. An information processing apparatus being capable of communicating with a printing apparatus, comprising:
    a determining unit configured to determine whether or not a frameless setting is enabled;
    an analyzing unit configured to analyze a margin amount on a rear edge side of a printing medium of an nth page (n is a natural number) created by printing an image based on printing data on the printing medium of the nth page and a margin amount on a leading edge side of the printing medium of an (n+1)th page created by printing an image based on printing data on the printing medium of an (n+1)th page; and
    a transmitting unit configured to transmit the printing data and margin information based on an analysis result of the analyzing unit,
    wherein the margin information is not transmitted when it is determined that the frameless setting is enabled, and
    wherein the printing apparatus is capable of executing successive overlapped conveyance in which a preceding printing medium and a succeeding printing medium are conveyed in a state in which a rear edge portion of the preceding printing medium and a leading edge portion of the succeeding printing medium overlap each other based on the margin information.

2. The apparatus according to claim 1, wherein the margin information is transmitted to the printing apparatus prior to transmission of the printing data to the printing apparatus.

3. The apparatus according to claim 2, wherein prior to transmission of the printing data to print on the printing medium of the nth page, the transmitting unit is capable of transmitting, to the printing apparatus, the margin information about the printing data for printing on the printing medium of the (n+1)th page.

4. The apparatus according to claim 1, wherein
    the transmitting unit is capable of executing transmission of a printing start instruction and transmission of the printing data for each page of the printing medium,
    the transmitting unit is capable of transmitting the margin information together with the printing start instruction, and
    the margin information can include
    an analysis result of the margin amount on the rear edge side of the printing medium regarding the printing data subjected to the printing start instruction, and
    an analysis result of the margin amount on the leading edge side of the printing medium regarding the printing data subjected to the printing start instruction of a next page.

5. The apparatus according to claim 1, wherein the printing data for printing on the printing medium of the (n+1)th page is generated before transmitting the printing data for printing on the printing medium of the nth page.

6. The apparatus according to claim 1, the margin amount on the rear edge side and the margin amount on the leading edge side are not analyzed when it is determined that the frameless setting is enabled.

7. An information processing method comprising:
determining whether or not a frameless setting is enabled,
analyzing a margin amount on a rear edge side of a printing medium of an nth page (n is a natural number) created by printing an image based on printing data on the printing medium of the nth page by a printing apparatus and a margin amount on a leading edge side of the printing medium of an (n+1)th page created by printing an image based on printing data on the printing medium by the printing apparatus; and
transmitting the printing data and margin information based on an analysis result of the analyzing to the printing apparatus,
wherein the margin information is not transmitted when it is determined that the frameless setting is enabled, and
wherein the printing apparatus is capable of executing successive overlapped conveyance in which a preceding printing medium and a succeeding printing medium are conveyed in a state in which a rear edge portion of the preceding printing medium and a leading edge portion of the succeeding printing medium overlap each other based on the margin information.

8. The method according to claim 7, wherein the margin information is transmitted to the printing apparatus prior to transmission of the printing data to the printing apparatus.

9. The method according to claim 7, wherein prior to transmission of the printing data to print on the printing medium of the nth page, margin information about the printing data for printing on the printing medium of the (n+1)th page is transmitted to the printing apparatus.

10. The method according to claim 7, wherein
in the transmitting, transmission of a printing start instruction and transmission of the printing data for each page of the printing medium is executed
in the transmitting, the margin information together with the printing start instruction is transmitted, and
the margin information can include
an analysis result of the margin amount on the rear edge side of the printing medium regarding the printing data subjected to the printing start instruction, and
an analysis result of the margin amount on the leading edge side of the printing medium regarding the printing data subjected to the printing start instruction of a next page.

11. The method according to claim 10, wherein in the analyzing, out of a printing job which designates printing on the printing media of a plurality of pages, a margin amount positioned on the rear edge side of the printing medium regarding the printing data of a first page, a margin amount on the leading edge side of the printing medium regarding the printing data of a final page, and margin amounts on the leading edge side and rear edge side of the printing media regarding the respective printing data of a second page to a page immediately preceding the final page is analyzed.

12. The method according to claim 7, wherein the printing data for printing on the printing medium of the (n+1)th page is generated before transmitting the printing data for printing on the printing medium of the nth page.

13. The method according to claim 7, wherein the respective printing data for printing on the printing media of all pages is generated before transmitting the printing data for printing on the printing medium of a first page.

14. The method according to claim 7, the margin amount on the rear edge side and the margin amount on the leading edge side are not analyzed when it is determined that the frameless setting is enabled.

15. A non-transitory computer-readable storage medium storing a program for causing a computer to function as:
determining whether or not a frameless setting is enabled,
analyzing a margin amount on a rear edge side of a printing medium of an nth page (n is a natural number) created by printing an image based on printing data on the printing medium of the nth page by a printing apparatus and a margin amount on a leading edge side of the printing medium created by printing an image based on printing data on the printing medium by the printing apparatus; and
transmitting the printing data and margin information based on an analysis result of the analyzing to the printing apparatus,
wherein the margin information is not transmitted when it is determined that the frameless setting is enabled, and
wherein the printing apparatus is capable of executing successive overlapped conveyance in which a preceding printing medium and a succeeding printing medium are conveyed in a state in which a rear edge portion of the preceding printing medium and a leading edge portion of the succeeding printing medium overlap each other based on the margin information.

16. The medium according to claim 15, wherein prior to transmission of the printing data to print on the printing medium of the nth page, margin information about the printing data for printing on the printing medium of the (n+1)th page is transmitted to the printing apparatus.

17. The medium according to claim 15, wherein the printing data for printing on the printing medium of the (n+1)th page is generated before transmitting the printing data for printing on the printing medium of the nth page.

18. The medium according to claim 15, wherein the respective printing data for printing on the printing media of all pages is generated before transmitting the printing data for printing on the printing medium of a first page.

19. A printing system comprising an information processing apparatus and a printing apparatus, wherein
said information processing apparatus comprises:
a determining unit configured to determine whether or not a frameless setting is enabled;
an analyzing unit configured to analyze a margin amount on a rear edge side of a printing medium of an nth page (n is a natural number) created by printing an image based on printing data on the printing medium of the nth page and a margin amount on a leading edge side of the printing medium of an (n+1)th page created by printing an image based on printing data on the printing medium of an (n+1)th page; and
a transmitting unit configured to transmit the printing data and margin information based on an analysis result of the analyzing unit, and
wherein the margin information is not transmitted when it is determined that the frameless setting is enabled, and
the printing apparatus is capable of executing successive overlapped conveyance in which a preceding printing medium and a succeeding printing medium are conveyed in a state in which a rear edge portion of the preceding printing medium and a leading edge portion of the succeeding printing medium overlap each other based on the margin information.

20. The system according to claim 19, wherein the margin information is transmitted to the printing apparatus prior to transmission of the printing data to the printing apparatus.

\* \* \* \* \*